US010037496B2

(12) United States Patent
Nakajima et al.

(10) Patent No.: US 10,037,496 B2
(45) Date of Patent: Jul. 31, 2018

(54) NUMBERED TICKET INFORMATION ISSUING SYSTEM, NUMBERED TICKET INFORMATION ISSUING SERVER, AND NUMBERED TICKET INFORMATION ISSUING METHOD

(71) Applicant: YAHOO JAPAN CORPORATION, Tokyo (JP)

(72) Inventors: Daishi Nakajima, Tokyo (JP); Yuichi Shiga, Tokyo (JP); Naoko Hiraya, Tokyo (JP); Keita Imaeda, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 889 days.

(21) Appl. No.: 14/324,978

(22) Filed: Jul. 7, 2014

(65) Prior Publication Data
US 2015/0120565 A1 Apr. 30, 2015

(30) Foreign Application Priority Data
Oct. 28, 2013 (JP) .................................. 2013-223700

(51) Int. Cl.
G06K 15/00 (2006.01)
G06Q 10/02 (2012.01)
H04W 4/70 (2018.01)

(52) U.S. Cl.
CPC .............. *G06Q 10/02* (2013.01); *H04W 4/70* (2018.02); *G06Q 2220/10* (2013.01)

(58) Field of Classification Search
CPC ........ G06Q 30/00; G06Q 50/10; G06Q 10/06; G06Q 20/045; G06Q 20/32; G06Q 20/382;
(Continued)

(56) References Cited

U.S. PATENT DOCUMENTS

2011/0165836 A1* 7/2011 Dixon .................. G06Q 20/045
455/41.1
2013/0117695 A1* 5/2013 Hammoud ............. G06Q 30/00
715/761

FOREIGN PATENT DOCUMENTS

JP     H08-123862 A     5/1996
JP     2002-109342 A    4/2002
(Continued)

OTHER PUBLICATIONS

Aug. 25, 2015 Office Action issued in Japanese Patent Application No. 2013-223700.
(Continued)

Primary Examiner — Thien T Mai
(74) Attorney, Agent, or Firm — Oliff PLC

(57) ABSTRACT

A numbered ticket information issuing system according to an embodiment includes a numbered ticket information issuing server. The numbered ticket information issuing server includes a numbered ticket information issuing unit and a numbered ticket information transmitting unit. The numbered ticket information issuing unit issues, when receiving, from a wireless terminal, a numbered ticket issue request containing information on a wireless device installed in a shop or a facility that provides a product or a service, numbered ticket information on the shop or the facility corresponding to the numbered ticket issue request. The numbered ticket information transmitting unit transmits the numbered ticket information issued by the numbered ticket information issuing unit to the wireless terminal.

11 Claims, 14 Drawing Sheets

(58) Field of Classification Search
CPC ........ G06Q 30/06; G06Q 30/02; G06Q 30/04;
G06Q 10/0637; G06Q 20/3552; G06Q
20/3278; G06Q 20/322; G06Q 20/12;
G06Q 20/204; G06Q 20/40; G06Q
30/0601; G06Q 40/12; G06Q 50/24;
G06Q 20/14; G06Q 20/16; G06Q
20/3221
See application file for complete search history.

(56) References Cited

FOREIGN PATENT DOCUMENTS

| | | |
|---|---|---|
| JP | 2003-044684 A | 2/2003 |
| JP | 2004-078836 A | 3/2004 |
| JP | 2004-178165 A | 6/2004 |
| JP | A-2008-77532 | 4/2008 |
| JP | A-2008-92420 | 4/2008 |
| WO | 2013/153689 A1 | 10/2013 |

OTHER PUBLICATIONS

Feb. 16, 2016 Office Action issued in Japanese Patent Application No. 2013-223700.
Oct. 3, 2017 Office Action issued in Japanese Patent Application No. 2016-175952.

\* cited by examiner

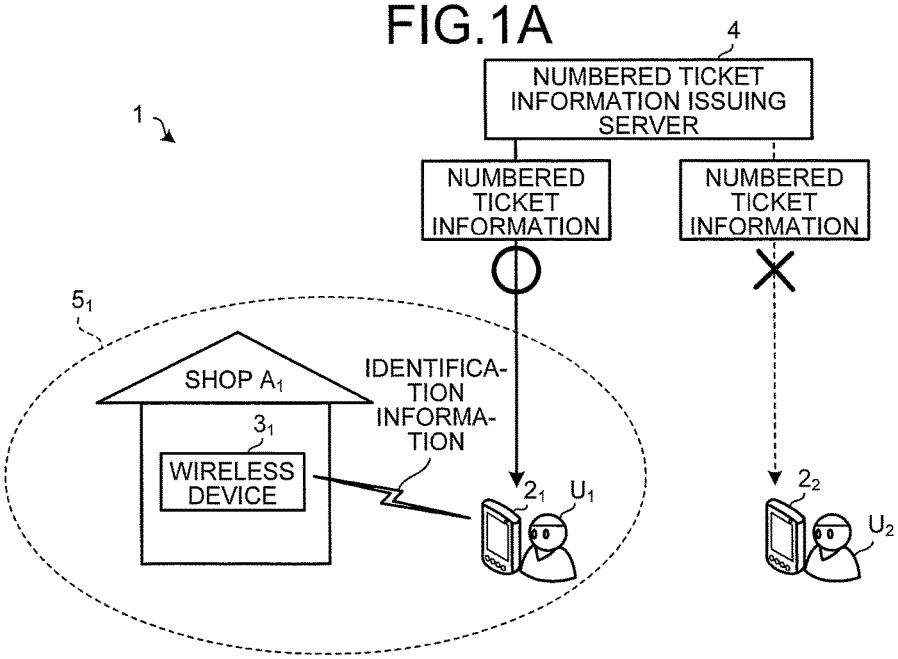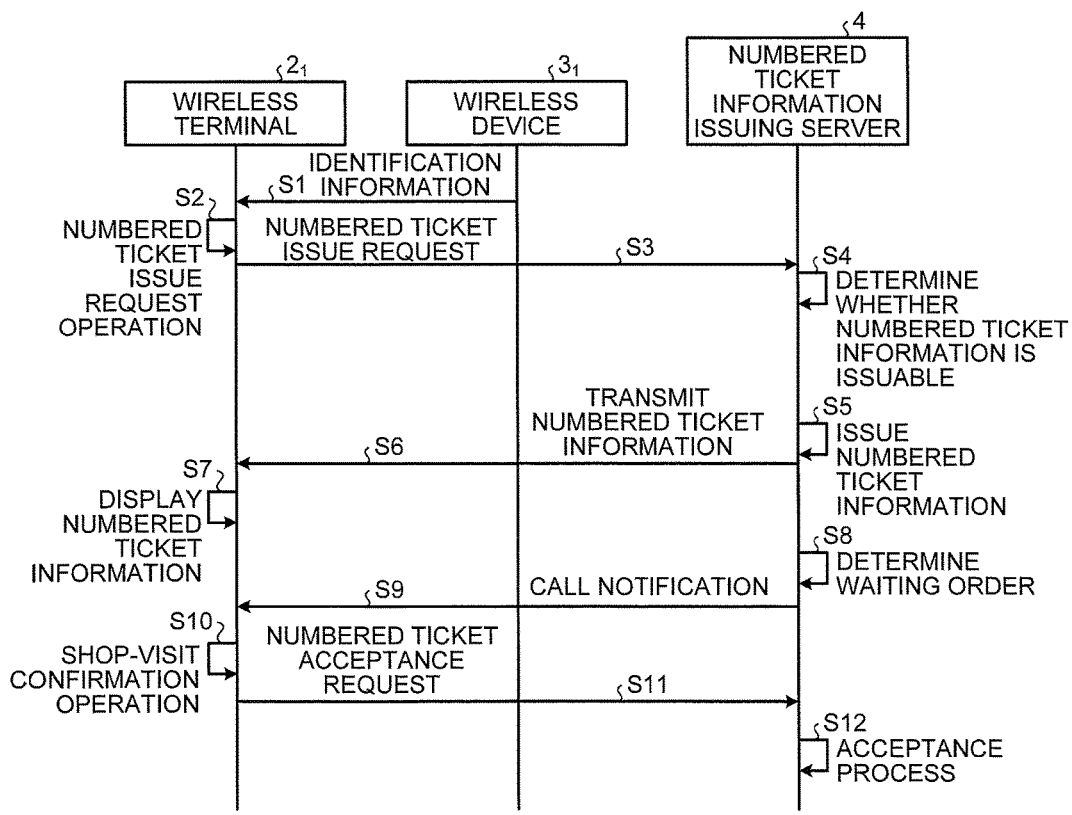

FIG.8A

```
NUMBERED TICKET SERVICE    220
─────────────────────────
      SHOP REGISTRATION
─────────────────────────
SHOP  ┌──────────┐           221
NAME  └──────────┘
ADDRESS  〒 ┌────┐
           └────┘            222
      ┌──────────────┐
      └──────────────┘

OPTION
 ☑ NUMBER OF PERSONS
 ☐ SMOKING/NO SMOKING         223
 ☐ SEAT
   (COUNTER/TABLE)

┌──────────┐            224
      │ REGISTER │
      └──────────┘
```

FIG.8B

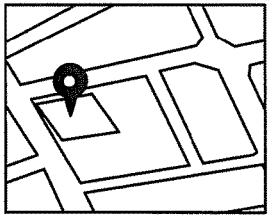

```
NUMBERED TICKET SERVICE    230
─────────────────────────
         ABC CAFE
─────────────────────────
      [  map  ]              231

OPTIONS
 NUMBER OF PERSONS
 SMOKING/NO SMOKING

┌────────────────┐     232
      │ START TICKETING│
      └────────────────┘
```

FIG.8C

| | NUMBERED TICKET SERVICE | | |
|---|---|---|---|
| | NUMBERED TICKET LIST | | |
| 242a | 10 | NUMBER OF PERSONS:2<br>SMOKING:<br>NO SMOKING<br>SEAT:TABLE | (bell with 1)<br>CALLED — 243a / 241a |
| 242b | 11 | NUMBER OF PERSONS:3<br>SMOKING:<br>NO SMOKING<br>SEAT:TABLE | COM-<br>PLETED — 243b / 241b |
| 242c | 12 | NUMBER OF PERSONS:1<br>SMOKING:<br>NO SMOKING<br>SEAT:COUNTER | (bell)<br>CALLING — 243c / 241c |
| 242d | 13 | NUMBER OF PERSONS:2<br>SMOKING:<br>NO SMOKING<br>SEAT:TABLE | (bell)<br>CALLING — 243d / 241d |
| 242e | 14 | NUMBER OF PERSONS:6<br>SMOKING:<br>NO SMOKING<br>SEAT:TABLE | (bell)<br>CALLING — 243e / 241e |

240

| MEMBER ID | MEMBER NAME | E-MAIL ADDRESS | PASSWORD |
|---|---|---|---|
| P1 | ABC | abc@xxx.com | diekd98de |
| P2 | BCD | bcd@yyy.com | kesie7ed |
| P3 | CDE | cde@zzz.com | 923898des0 |
| ⋮ | ⋮ | ⋮ | ⋮ |

FIG.11

| SHOP ID | MEMBER ID | SHOP NAME | ADDRESS | OPTIONAL INFORMATION | | | BUSINESS HOURS | WIRELESS DEVICE ID |
| | | | | NUMBER OF PERSONS | SMOK-ING | SEAT | | |
|---|---|---|---|---|---|---|---|---|
| A1 | P1 | ABC CAFE | TOKYO··· | 1 | 1 | 1 | 11:00-15:00 17:00-23:00 | ueisp00223 |
| A2 | P1 | BCD CAFE | TOKYO··· | 1 | 0 | 0 | 10:00-22:00 | udiekeo987 |
| A3 | P2 | CDE CAFE | TOKYO··· | 1 | 0 | 1 | 11:00-1900 | 28eodetioe |
| ⋮ | ⋮ | ⋮ | ⋮ | ⋮ | ⋮ | ⋮ | ⋮ | ⋮ |

FIG.12

| SHOP ID | TERMINAL ID | WAITING ORDER | NUMBERED TICKET NUMBER | EXPIRY DATE | NUMBER OF PERSONS | SMOK-ING | SEAT | CALL STATE |
|---|---|---|---|---|---|---|---|---|
| A1 | T009 | - | 10 | 201X/XX/XX, XX:XX | 2 | 0 | 1 | CALLED |
| | T102 | - | 11 | 201X/XX/XX, XX:XX | 3 | 0 | 1 | ACCEPTANCE COMPLETED |
| | T001 | 1 | 12 | 201X/XX/XX, XX:XX | 2 | 0 | 1 | UNCALLED |
| | T098 | 2 | 13 | 201X/XX/XX, XX:XX | 3 | 0 | 1 | UNCALLED |
| | T076 | 3 | 14 | 201X/XX/XX, XX:XX | 3 | 0 | 1 | UNCALLED |
| | ⋮ | ⋮ | ⋮ | ⋮ | ⋮ | ⋮ | ⋮ | ⋮ |
| A2 | ⋮ | ⋮ | ⋮ | ⋮ | ⋮ | ⋮ | ⋮ | ⋮ |
| | ⋮ | ⋮ | ⋮ | ⋮ | ⋮ | ⋮ | ⋮ | ⋮ | ed States Patent US 10,037,496 B2

NUMBERED TICKET INFORMATION ISSUING SYSTEM, NUMBERED TICKET INFORMATION ISSUING SERVER, AND NUMBERED TICKET INFORMATION ISSUING METHOD

CROSS-REFERENCE TO RELATED APPLICATIONS

The present application claims priority to and incorporates by reference the entire contents of Japanese Patent Application No. 2013-223700 filed in Japan on Oct. 28, 2013.

BACKGROUND OF THE INVENTION

1. Field of the Invention

The present invention relates to a numbered ticket information issuing system, a numbered ticket information issuing server, and a numbered ticket information issuing method.

2. Description of the Related Art

In restaurants, financial institutions, hospitals, retailers, theme parks, and the like, customers come one after the other in a short time resulting in congestion in some cases. In such places that may become congested, numbered ticket dispensers may be provided. A customer who comes to a shop operates a numbered ticket dispenser, receives a numbered ticket issued from the numbered ticket dispenser, and waits for his/her turn.

Conventional numbered ticket dispensers issue numbered ticket papers on which orders are printed. However, to improve the convenience, ticketing systems have been proposed that issue electronic numbered ticket information to mobile terminals.

For example, Japanese Laid-open Patent Publication No. 2008-092420 discloses a technique, in which a mobile terminal receives numbered ticket data issued by a numbered ticket data issuing terminal via near field wireless communication and the mobile terminal transmits the numbered ticket data to a numbered ticket data confirmation terminal via near field wireless communication to confirm the order of a numbered ticket.

Furthermore, Japanese Laid-open Patent Publication No. 2008-077532 discloses a technique, in which a mobile terminal with a contactless IC card performs contactless communication with an accepting device installed in a shop and acquires a numbered ticket issued by the accepting device.

In the techniques described in Japanese Laid-open Patent Publication No. 2008-092420 and Japanese Laid-open Patent publication No. 2008-077532, numbered ticket data is provided via near field wireless communication or a contactless IC card; therefore, it is possible to prevent numbered ticket information from being provided to customers who have not visited the shop. However, in these techniques, it is necessary to install numbered ticket issuing apparatuses (numbered ticket data issuing terminals or accepting devices) that issue numbered ticket information in shops or facilities, and it is also necessary to perform processes of transmitting and receiving the numbered ticket information between mobile terminals and the numbered ticket issuing apparatuses.

SUMMARY OF THE INVENTION

A numbered ticket information issuing system according to an embodiment includes a wireless terminal and a numbered ticket information issuing server. The wireless terminal includes an identification information acquiring unit, a numbered ticket issue requesting unit, and a numbered ticket information receiving unit. The identification information acquiring unit acquires, from a wireless device installed in a shop or a facility that provides a product or a service, identification information on the wireless device. The numbered ticket issue requesting unit transmits a numbered ticket issue request corresponding to the shop or the facility to the numbered ticket information issuing server based on the identification information on the wireless device acquired by the identification information acquiring unit. The numbered ticket information receiving unit receives numbered ticket information transmitted from the numbered ticket information issuing server according to the numbered ticket issue request. The numbered ticket information issuing server includes a numbered ticket information issuing unit and a numbered ticket information transmitting unit. The numbered ticket information issuing unit, when receiving the numbered ticket issue request from the wireless terminal, issues numbered ticket information on the shop or the facility corresponding to the numbered ticket issue request. The numbered ticket information transmitting unit transmits the numbered ticket information issued by the numbered ticket information issuing unit to the wireless terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are explanatory diagrams of a numbered ticket information issuing process according to a first embodiment;

FIGS. 7A, 7B, and 8A to 8C are diagrams illustrating examples of a screen displayed on a display unit of the wireless device;

FIG. 11 is a diagram illustrating an example of a shop information table;

FIG. 12 is a diagram illustrating an example of a numbered ticket information table;

DETAILED DESCRIPTION OF THE PREFERRED EMBODIMENTS

Figure 2:
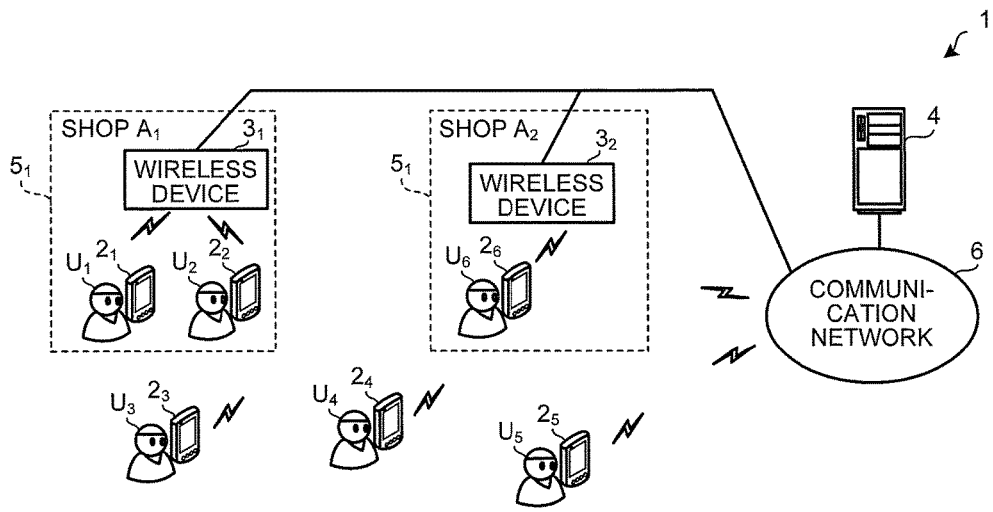
FIG. 2 is a diagram illustrating a configuration example of a numbered ticket information issuing system according to the first embodiment.

Hereinafter, modes (hereinafter, referred to as "embodiments") for carrying out a numbered ticket information issuing system, a numbered ticket information issuing server, and a numbered ticket information issuing method according to the present invention will be described in detail with reference to drawings. The numbered ticket information issuing system, the numbered ticket information issuing server, and the numbered ticket information issuing method according to the present invention are not limited by the embodiments. Further, a database is hereinafter described as a DB.

1. First Embodiment

1.1. Numbered Ticket Information Issuing Process

First, a numbered ticket information issuing process according to a first embodiment will be described. FIG. 1A and FIG. 1B are explanatory diagrams of the numbered ticket information issuing process according to the first embodiment. In the present embodiment, a numbered ticket information issuing system performs the numbered ticket information issuing process.

As illustrated in FIG. 1A, a numbered ticket information issuing system 1 according to the embodiment includes wireless terminals $2_1$ and $2_2$, a wireless device $3_1$, and a numbered ticket information issuing server 4. The wireless terminals $2_1$ and $2_2$, the wireless device $3_1$, and the numbered ticket information issuing server 4 are connected to one another via a communication network, such as the Internet.

The wireless terminals $2_1$ and $2_2$ are portable wireless terminals, such as smartphones or mobile personal computers (PCs). In control units of the wireless terminals $2_1$ and $2_2$, for example, programs of a user's numbered ticket issuing application acquired from the numbered ticket information issuing server 4 are installed, and information is transmitted and received to and from the numbered ticket information issuing server 4.

The wireless device $3_1$ is installed in a shop or a facility of a provider that provides products or services. In the example illustrated in FIG. 1A, the wireless device $3_1$ is installed in a shop $A_1$. The shop or the facility of the provider includes, for example, retailers, restaurants, hair salons, hospitals, hotels, leisure complexes, and the like, as well as event sites for concerts, sports, or the like. The facility of the provider also includes, for example, amusement attractions, catering trucks, or the like in leisure facilities. In the wireless device $3_1$, for example, programs of a member's numbered ticket issuing application acquired from the numbered ticket information issuing server 4 are installed, and information is transmitted and received to and from the numbered ticket information issuing server 4.

The numbered ticket information issuing server 4 performs various processes, such as a process of issuing numbered ticket information to the wireless terminals $2_1$ and $2_2$, a process of determining a wait for a turn corresponding to the issued numbered ticket information, or a process of notifying a waiting order. As illustrated in FIG. 1A, the numbered ticket information issuing server 4 provides the numbered ticket information to the wireless terminal $2_1$ located in a wireless communication area $5_1$ of the wireless device $3_1$, and does not issue the numbered ticket information to the wireless terminal $2_2$ that is not located in the wireless communication area $5_1$. Therefore, it becomes possible to prevent the numbered ticket information from being issued to users U who are not in or around the shop or the facility in which the wireless device $3_1$ is installed, enabling to fairly deal with the wait for a turn among the users U. Hereinafter, the shop and the facility are collectively referred to as a shop for convenience of explanation.

An example of a process performed when a user $U_1$ of the wireless terminal $2_1$ visits the shop $A_1$ will be described below with reference to FIG. 1B.

The wireless device $3_1$ transmits a wireless signal containing identification information (hereinafter, described as a wireless device ID) on the wireless device $3_1$ installed in the shop $A_1$ in the wireless communication area $5_1$, and when the user $U_1$ of the wireless terminal $2_1$ enters the wireless communication area $5_1$, the wireless terminal $2_1$ acquires the wireless device ID transmitted from the wireless device $3_1$ (Step S1). The wireless communication area $5_1$ is an area including the shop $A_1$, and, for example, includes a surrounding area of the shop $A_1$.

If the user $U_1$ of the wireless terminal $2_1$ performs a numbered ticket issue request operation with respect to the shop $A_1$ by using the user's numbered ticket issuing application (Step S2), the wireless terminal $2_1$ sends a numbered ticket issue request to the numbered ticket information issuing server 4 (Step S3). The numbered ticket issue request contains the wireless device ID of the wireless device $3_1$ and identification information on the shop $A_1$ (hereinafter, described as a shop ID).

Upon receiving the numbered ticket issue request from the wireless terminal $2_1$, the numbered ticket information issuing server 4 determines whether numbered ticket information is issuable (Step S4). The numbered ticket information issuing server 4 stores therein a shop information table, in which the wireless device ID and the shop ID are associated with each other, and if a combination of the wireless device ID and the shop ID set in the shop information table is contained in a numbered ticket issue request, the numbered ticket information issuing server 4 decides to issue the numbered ticket information.

When deciding to issue the numbered ticket information, the numbered ticket information issuing server 4 issues numbered ticket information corresponding to the shop ID contained in the numbered ticket issue request (Step S5), and transmits the issued numbered ticket information to the wireless terminal $2_1$ (Step S6). The wireless terminal $2_1$ acquires the numbered ticket information transmitted from the numbered ticket information issuing server 4, and displays it on the display unit (Step S7). Therefore, the user $U_1$ of the wireless terminal $2_1$ can acquire the numbered ticket information on the shop $A_1$.

In contrast, at Step S4, if the combination of the wireless device ID and the shop ID set in the shop information table is not contained in the numbered ticket issue request, the numbered ticket information issuing server 4 decides not to issue the numbered ticket information. When deciding not to issue the numbered ticket information, the numbered ticket information issuing server 4 notifies the wireless terminal 2$_1$, which has sent the numbered ticket issue request, that the numbered ticket is not issuable.

The numbered ticket information issuing server 4 determines a waiting order of the user $U_1$ of the wireless terminal 2$_1$ (Step S8), and performs a call notification on the wireless terminal 2$_1$ for which the determined waiting order has fallen within a predetermined range (Step S9).

Upon the call notification, the user $U_1$ of the wireless terminal 2$_1$ shows the numbered ticket information provided to the wireless terminal 2$_1$ to a staff of the shop $A_1$. When the staff of the shop $A_1$ performs an acceptance operation on the wireless terminal 2$_1$ (Step S10), a numbered ticket acceptance request is transmitted from the wireless terminal 2$_1$ to the numbered ticket information issuing server 4 (Step S11), and the numbered ticket information issuing server 4 ends an acceptance process on the numbered ticket information for the user $U_1$ (Step S12).

1.2. Configuration of the Numbered Ticket Information Issuing System 1

A configuration example of the numbered ticket information issuing system 1 according to the embodiment will be described with reference to FIG. 2. FIG. 2 is a diagram illustrating a configuration example of the numbered ticket information issuing system 1 according to the embodiment.

As illustrated in FIG. 2, the numbered ticket information issuing system 1 includes the wireless terminals 2$_1$ to 2$_6$ (hereinafter, may be collectively referred to as a wireless terminal 2), the wireless devices 3$_1$ and 3$_2$ (hereinafter, may be collectively referred to as a wireless device 3), and the numbered ticket information issuing server 4.

The wireless terminal 2, the wireless device 3, and the numbered ticket information issuing server 4 are communicably connected to one another via a communication network 6. The communication network 6 is, for example, a wide area network (WAN), such as the Internet.

The wireless terminals 2$_1$ to 2$_6$ are wireless terminals carried by users $U_1$ to $U_6$ who visit shops of providers or purchase products or services in the shops of the providers. The wireless terminal 2 is a portable wireless terminal as described above, and can communicate with a wireless WAN base station (not illustrated) connected to the communication network 6. Furthermore, the wireless terminal 2 can receive a wireless signal output by the wireless device 3 and acquire a wireless device ID contained in the wireless signal.

The wireless device 3 can communicate with the wireless WAN base station (not illustrated) connected to the communication network 6, similarly to the wireless terminal 2. Furthermore, the wireless device 3 outputs a wireless signal containing a wireless device ID through wireless communication, such as a wireless local area network (LAN), near field communication (NFC), or Bluetooth (registered trademark). Wireless communication areas 5$_1$ and 5$_2$ (hereinafter, may be collectively referred to as a wireless communication area 5) are areas in which the wireless terminal 2 can receive the wireless signal. The wireless communication area 5$_1$ corresponds to the wireless device 3$_1$, and the wireless communication area 5$_2$ corresponds to the wireless device 3$_2$.

In the following, an explanation is given based on the assumption that the wireless device 3 is a tablet PC having a wireless LAN communication function. However, the wireless device 3 may output a wireless signal containing a wireless device ID not by wireless LAN communication but by Bluetooth (registered trademark) communication or an NFC communication function. Furthermore, the wireless device 3 may be a notebook PC or a smartphone. Incidentally, a communication area of the NFC is a communication area of about 1 meter to a few centimeters, and examples of the NFC include Felica and ISO/IEC14443 (MIFARE).

Configurations of the wireless terminal 2, the wireless device 3, and the numbered ticket information issuing server 4 will be described below in this order.

1.3. Wireless Terminal 2

Figure 3:
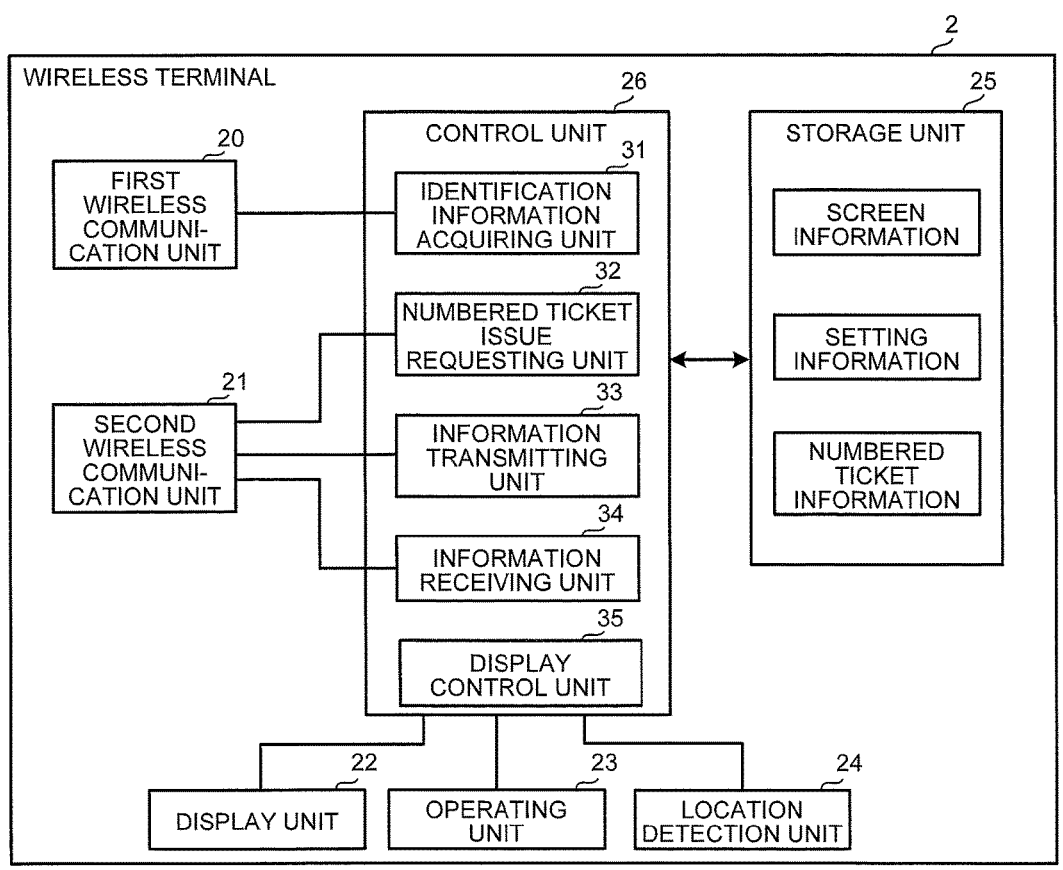
FIG. 3 is a diagram illustrating a configuration example of a wireless terminal illustrated in FIG. 2.

FIG. 3 is a diagram illustrating a configuration example of the wireless terminal 2. As illustrated in FIG. 3, the wireless terminal 2 includes a first wireless communication unit 20, a second wireless communication unit 21, a display unit 22, an operating unit 23, a location detection unit 24, a storage unit 25, and a control unit 26.

The first wireless communication unit 20 is a communication interface having a wireless LAN communication function, and receives wireless signals output from the wireless device 3. It is satisfactory if the first wireless communication unit 20 can receive the wireless signals output from the wireless device 3, and if, for example, the wireless device 3 has an NFC communication function, a communication interface having an NFC communication function is applicable.

The second wireless communication unit 21 is a communication interface that transmits and receives information to and from the wireless WAN base station. The wireless WAN base station is, for example, a wireless base station of a public phone network or a wireless base station of a public data network.

The display unit 22 is a touch-panel display. The user U of the wireless terminal 2 can perform operations on an operation screen of the user's numbered ticket issuing application displayed on the display unit 22 by performing operations on the screen of the display unit 22 with a finger or the like. The display unit 22 is, for example, a compact liquid crystal display (LCD) or an organic EL display.

The operating unit 23 includes a keyboard with keys for inputting letters, numbers, or spaces, enter keys, arrow keys, and the like, and includes a power button and the like.

The location detection unit 24 has a global positioning system (GPS) receiving function, and acquires information on a current location of the wireless terminal 2. The information on the current location is latitude and longitude, but may be an address.

The storage unit 25 is a storage device, such as a semi-conductor memory device including a random access memory (RAM), a flash memory, or the like, a hard disk, or a memory card. The storage unit 25 stores therein, for example, an operating system (OS), programs of the user's numbered ticket issuing application acquired from the numbered ticket information issuing server 4, and the like.

The storage unit 25 stores therein, for example, screen information, setting information, numbered ticket information, and the like. These pieces of the information are set and updated in the storage unit 25 when the control unit 26 executes the user's numbered ticket issuing application. The screen information includes, for example, information on layouts of various screens to be described later, and is used to generate the various screens to be described later.

The control unit 26 is realized by, for example, an integrated circuit, such as an ASIC or an FPGA. When programs stored in the storage unit 25 are executed by, for example, a CPU, an MPU, or the like by using an internal RAM (not illustrated) as a work area, the control unit 26 realizes or executes functions and operations of information processing to be described later.

Specifically, the control unit 26 executes the user's numbered ticket issuing application whose program data is stored in the storage unit 25, to thereby function as an identification information acquiring unit 31, a numbered ticket issue requesting unit 32, an information receiving unit 34, an information transmitting unit 33, and a display control unit 35. Incidentally, the configuration of the control unit 26 is not limited to the above example, and other configurations are applicable as long as they perform information processing to be described later.

The identification information acquiring unit 31 acquires a wireless device ID contained in a wireless signal transmitted from the wireless device 3 via the first wireless communication unit 20. The identification information acquiring unit 31 stores the acquired wireless device ID in the storage unit 25. The wireless signal containing the wireless device ID is repeatedly transmitted from the wireless device 3, and if the identification information acquiring unit 31 cannot acquire the same wireless device ID within a predetermined time (for example, within one minute) after acquiring unit of the wireless device ID, it deletes the wireless device ID from the storage unit 25.

If the wireless signal transmitted from the wireless device 3 is a wireless signal in wireless LAN communication, the wireless device ID is an extended service set identifier (ESS-ID) or a basic service set identifier (BSS-ID). Incidentally, the wireless device ID is not limited to the ESS-ID and the BSS-ID, but may be other than these IDs.

When the user U performs a numbered ticket issue request operation by operating the operating unit 23 (hereinafter, referred to as a user operation), the numbered ticket issue requesting unit 32 transmits a numbered ticket issue request to the numbered ticket information issuing server 4 via the second wireless communication unit 21. The numbered ticket issue request contains the wireless device ID stored in the storage unit 25 and a shop ID of a shop corresponding to the numbered ticket issue request operation.

The information transmitting unit 33 transmits various types of information to the numbered ticket information issuing server 4. The information transmitted to the numbered ticket information issuing server 4 includes, for example, location information on the wireless terminal 2, a shop list information request, a shop information request, a numbered ticket cancel request, a numbered ticket reissue request, a numbered ticket acceptance request, and the like. When the numbered ticket information is stored in the storage unit 25, the information transmitting unit 33 periodically transmits, to the numbered ticket information issuing server 4, the location information on the wireless terminal 2 acquired by the location detection unit 24 and the wireless device ID of the wireless device 3 acquired by the identification information acquiring unit 31.

The information receiving unit 34 acquires various types of information transmitted from the numbered ticket information issuing server 4, and stores the acquired information in the storage unit 25. The information transmitted from the numbered ticket information issuing server 4 includes, for example, shop list information, shop information, numbered ticket information, call notification information, wait end information, acceptance information, numbered ticket expiry information, and the like, and these pieces of information are received by the information receiving unit 34 and stored in the storage unit 25.

The display control unit 35 controls display of the display unit 22 by using the screen information stored in the storage unit 25 based on user operations. FIGS. 4A to 4D and FIGS. 5A and 5B are diagrams illustrating examples of screens displayed on the display unit 22 by the display control unit 35.

Figure 4A:
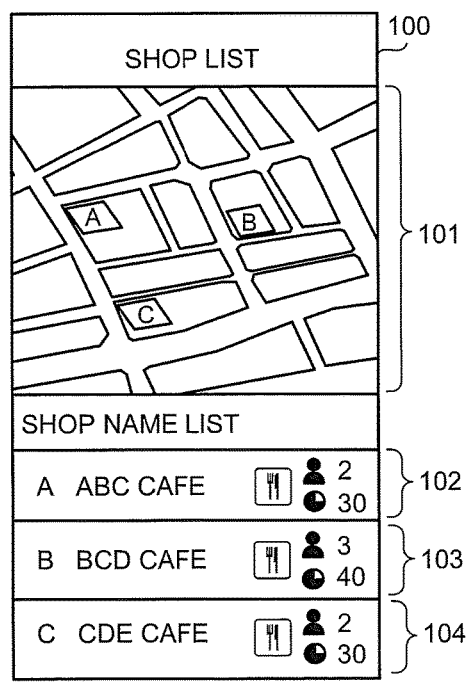
FIGS. 4A to 4D, 5A and 5B are diagrams illustrating examples of a screen displayed on a display unit of the wireless terminal.

FIG. 4A is a diagram illustrating an example of a shop list screen. As illustrated in FIG. 4A, a shop list screen 100 contains a map information display area 101 for indicating a location of a shop and shop information display areas 102 to 104. The display control unit 35 displays the shop list screen 100 on the display unit 22 based on the shop list information acquired by the information receiving unit 34.

In the map information display area 101, "A" indicating a location of an "ABC cafe", "B" indicating a location of a "BCD cafe", and "C" indicating a location of a "CDE cafe" are arranged at respective corresponding positions on a map.

In each of the shop information display areas 102 to 104, pieces of information such as location information, a shop name, a shop type, the number of waiting groups, and a wait time are displayed. For example, in the shop information display area 102, information indicating a location of "A", a shop name of "ABC cafe", a shop type of "restaurant", the number of waiting groups of "2 groups", and a wait time of "30 minutes" is displayed. The number of waiting groups is the number of groups of the users U for whom the numbered ticket information have been issued and who are waiting for calls. The wait time is a wait time of the user U with the largest waiting order.

The shop list information is requested from the information transmitting unit 33 to the numbered ticket information issuing server 4 based on user operations, and is acquired by the information receiving unit 34. Specifically, when display of the shop list screen 100 is requested by a user operation, the information transmitting unit 33 transmits a shop list information request containing information on a geographical range corresponding to the user operation to the numbered ticket information issuing server 4. The information receiving unit 34 acquires shop list information transmitted from the numbered ticket information issuing server 4 according to the shop list information request.

Furthermore, if any of the shop information display areas 102 to 104 is selected by a user operation, a shop information request for requesting for shop information corresponding to the selected area is sent from the information transmitting unit 33 to the numbered ticket information issuing server 4. The information receiving unit 34 acquires shop information transmitted from the numbered ticket information issuing server 4 according to the shop information request. The display control unit 35 displays, on the display unit 22, a numbered ticket issue request screen based on the shop information acquired by the information receiving unit 34.

Figure 4B:
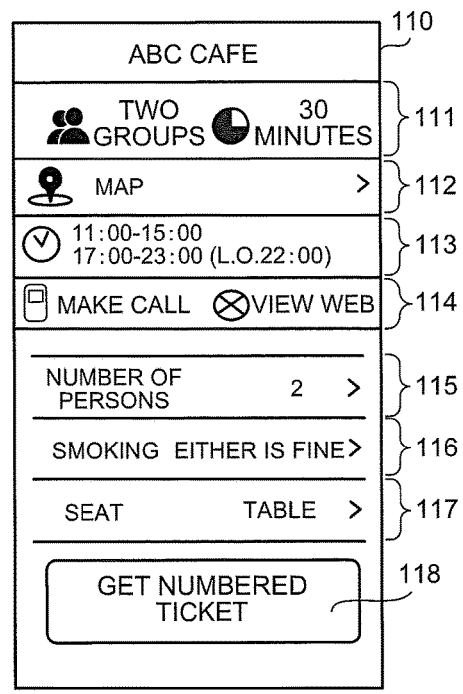

FIG. 4B is a diagram illustrating an example of the numbered ticket issue request screen. As illustrated in FIG. 4B, in a numbered ticket issue request screen 110, a wait state display area 111, a map display operation area 112, a business hours display area 113, an access operation area 114, a number-of-persons setting area 115, a smoking setting area 116, a seat setting area 117, and a numbered ticket issue operation area 118 are displayed.

In the wait state display area 111, information on the number of waiting groups and a wait time in the shop is displayed. In the business hours display area 113, information on business hours of the shop is displayed. The map display operation area 112, the access operation area 114, the number-of-persons setting area 115, the smoking setting area 116, the seat setting area 117, and the numbered ticket issue operation area 118 are areas in which user operations are performed.

When a user operation is performed on the map display operation area 112, the information transmitting unit 33 transmits a map information request to the numbered ticket information issuing server 4. Map information transmitted from the numbered ticket information issuing server 4 according to the map information request is received by the information receiving unit 34 and displayed on the display unit 22 by the display control unit 35.

When a user operation is performed on the access operation area 114, the information transmitting unit 33 accesses a phone number of the shop or a web page of the shop via the second wireless communication unit 21 according to the user operation. Therefore, it becomes possible to make a call or acquire information via the website.

When a user operation is performed on the number-of-persons setting area 115, the display control unit 35 displays, for example, a combo box that allows the user U to select the number of persons, and causes the user U to select the number of persons to be a target of a numbered ticket. Furthermore, when a user operation is performed on the smoking setting area 116, the display control unit 35 displays, for example, a combo box that allows the user U to select any of "no smoking", "smoking", and "either is fine", and causes a selection to be made.

When a user operation is performed on the seat setting area 117, the display control unit 35 displays, for example, a combo box that allows the user U to select one of a table seat and a counter seat, and causes the user U to select a seat to be a target of the numbered ticket.

When a user operation is performed on the numbered ticket issue operation area 118, the numbered ticket issue requesting unit 32 transmits a numbered ticket issue request to the numbered ticket information issuing server 4. The numbered ticket issue request contains the wireless device ID stored in the storage unit 25, a shop ID of a shop corresponding to the numbered ticket issue request screen 110, and the pieces of the information set in the number-of-persons setting area 115, the smoking setting area 116, and the seat setting area 117.

When numbered ticket information corresponding to the numbered ticket issue request is transmitted from the numbered ticket information issuing server 4 to the wireless terminal 2, the numbered ticket information is received by the information receiving unit 34. The display control unit 35 displays a numbered ticket information screen based on the numbered ticket information received by the information receiving unit 34.

Figure 4C:
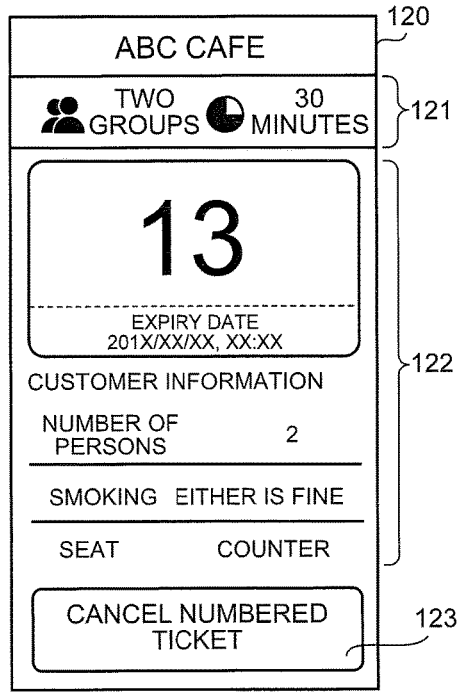

FIG. 4C is a diagram illustrating an example of the numbered ticket information screen. As illustrated in FIG. 4C, in a numbered ticket information screen 120, a wait state display area 121, a numbered ticket information display area 122, and a cancel operation area 123 are displayed. The wait state display area 121 is the same as the wait state display area 111.

The numbered ticket information display area 122 contains information on a numbered ticket number, a numbered ticket expiry date, the number of target persons of the numbered ticket, smoking setting, seat setting, and the like. In the numbered ticket information display area 122 illustrated in FIG. 4C, "13" is displayed as the numbered ticket number, "201x/xx/xx, xx:xx" is displayed as the numbered ticket expiry date, "two persons" is displayed as the number of target persons of the numbered ticket, "either is fine" is displayed as the smoking setting, and "counter" is displayed as the seat setting.

The cancel operation area 123 is an area for ordering cancellation of the numbered ticket information. When the cancel operation area 123 is operated through a user operation, the information transmitting unit 33 transmits a numbered ticket cancel request to the numbered ticket information issuing server 4. The numbered ticket cancel request contains the shop ID of the shop and the numbered ticket number (or, a terminal ID) corresponding to the numbered ticket information screen.

After the numbered ticket information is issued by the numbered ticket information issuing server 4, if, for example, a wait time for a product or a service corresponding to the numbered ticket information falls within a predetermined range, call notification information is transmitted from the numbered ticket information issuing server 4 to the wireless terminal 2 and is received by the information receiving unit 34. The display control unit 35 displays a call notification screen based on the call notification information received by the information receiving unit 34.

Figure 4D:
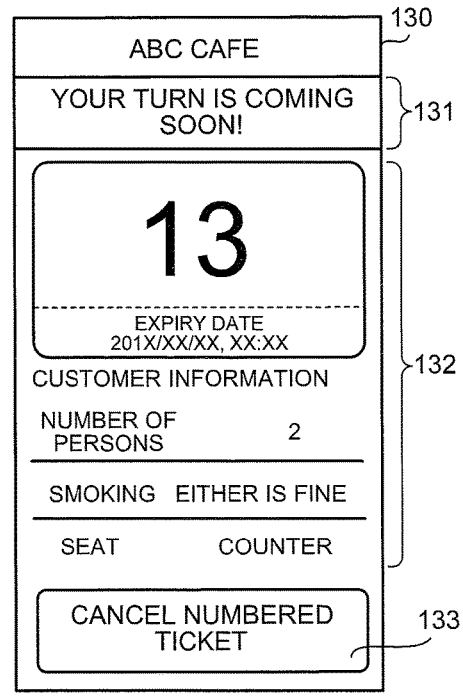

FIG. 4D is a diagram illustrating an example of the call notification screen. As illustrated in FIG. 4D, in a call notification screen 130, a call notification display area 131, a numbered ticket information display area 132, and a cancel operation area 133 are displayed. The numbered ticket information display area 132 and the cancel operation area 133 are the same as the numbered ticket information display area 122 and the cancel operation area 123 illustrated in FIG. 4C.

In the call notification display area 131, the call notification information is displayed. In the example illustrated in FIG. 4D, characters "Your turn is coming soon!" are displayed in the call notification display area 131; however, information on the order, a remaining wait time, or the like is applicable. The display control unit 35 may color, intensify, or blink characters corresponding to the call notification information.

After the numbered ticket information is issued by the numbered ticket information issuing server 4, if a wait for a product or a service corresponding to the numbered ticket information ends, wait end information is transmitted from the numbered ticket information issuing server 4 to the wireless terminal 2 and is received by the information receiving unit 34. The display control unit 35 displays a wait end screen based on the wait end information received by the information receiving unit 34.

Figure 5A:
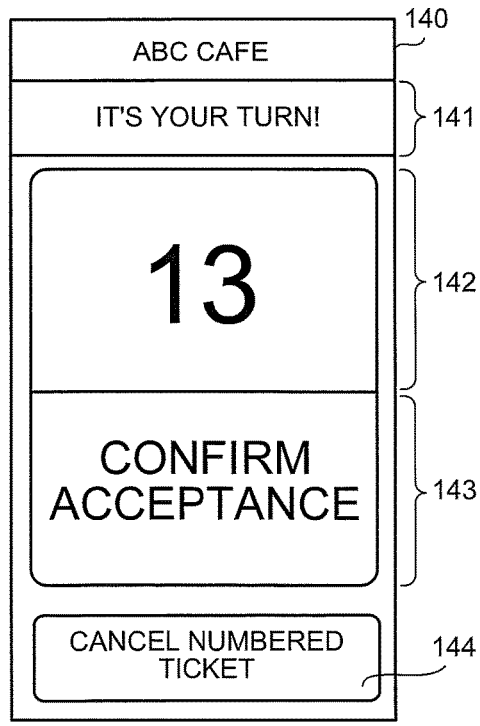

FIG. 5A is a diagram illustrating an example of the wait end screen. As illustrated in FIG. 5A, in a call notification screen 140, a wait end display area 141, a numbered ticket information display area 142, an acceptance confirmation operation area 143, and a cancel operation area 144 are displayed. The cancel operation area 144 is the same as the cancel operation area 123 illustrated in FIG. 4C.

In the wait end display area 141, the wait end information is displayed. In the example illustrated in FIG. 5A, characters "It's your turn!" are displayed in the wait end display area 141. The display control unit 35 may color, intensify, or blink characters corresponding to the wait end information.

When the acceptance confirmation operation area 143 is operated, the information transmitting unit 33 transmits a numbered ticket acceptance request to the numbered ticket information issuing server 4. Upon receiving acceptance information from the numbered ticket information issuing server 4 according to the numbered ticket acceptance request, the display control unit 35 displays an acceptance completion screen (not illustrated) on the display unit 22.

After the numbered ticket information is issued by the numbered ticket information issuing server 4, if an expiry date of the numbered ticket information has passed without acceptance of the numbered ticket information, numbered ticket expiry information is transmitted from the numbered ticket information issuing server 4 to the wireless terminal 2 and is received by the information receiving unit 34. The display control unit 35 displays a numbered ticket expiry screen based on the numbered ticket expiry information received by the information receiving unit 34.

Figure 5B:
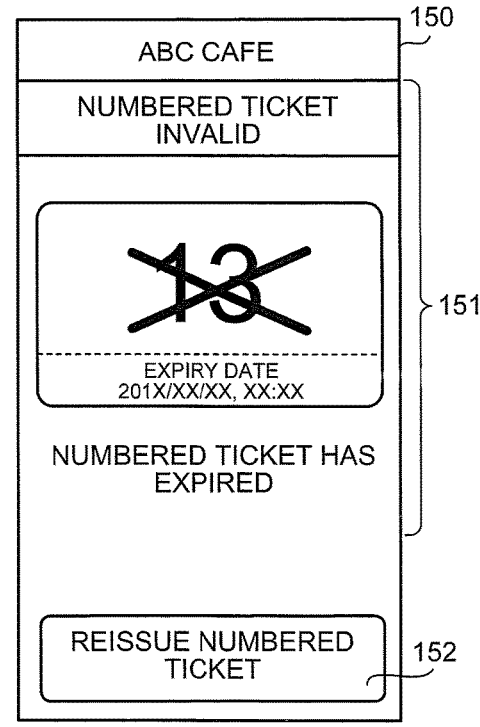

FIG. 5B is a diagram illustrating an example of the numbered ticket expiry screen. As illustrated in FIG. 5B, in a numbered ticket expiry screen 150, a numbered ticket expiry display area 151 and a reissue operation area 152 are displayed. In the numbered ticket expiry display area 151, information indicating expiry of the numbered ticket information is displayed. In the example illustrated in FIG. 5B, characters "Numbered ticket invalid" and "Numbered ticket has expired" are displayed in the numbered ticket expiry screen 150. When a user operation is performed on the reissue operation area 152, the information transmitting unit 33 transmits a numbered ticket reissue request to the numbered ticket information issuing server 4.

1.4. Wireless Device 3

Figure 6:
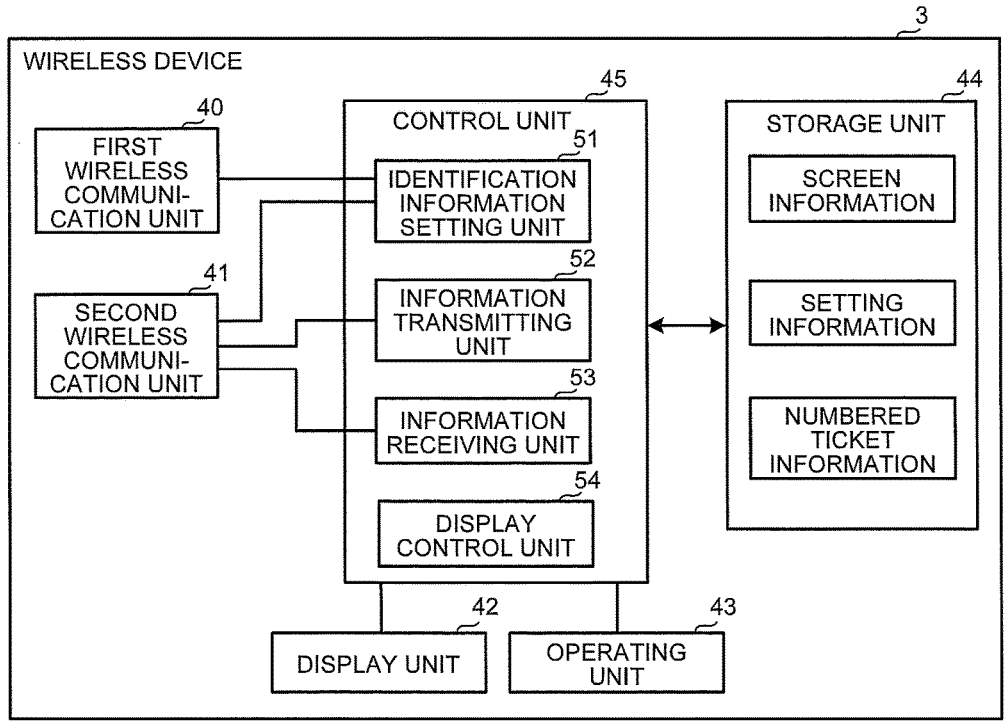
FIG. 6 is a diagram illustrating a configuration example of a wireless device.

FIG. 6 is a diagram illustrating a configuration example of the wireless device 3. As illustrated in FIG. 6, the wireless device 3 includes a first wireless communication unit 40, a second wireless communication unit 41, a display unit 42, an operating unit 43, a storage unit 44, and a control unit 45.

The first wireless communication unit 40 is a communication interface having a wireless LAN communication function, and outputs a wireless signal containing a wireless device ID. The second wireless communication unit 41 is a communication interface that transmits and receives information to and from the wireless WAN base station. The first wireless communication unit 40 may be a communication interface, such as an NFC communication function or a Bluetooth (registered trademark) communication function, which performs communication other than the wireless LAN communication.

The display unit 42 is a touch-panel display. A user of the wireless device 3 can perform operations on an operation screen of the member's numbered ticket issuing application displayed on the display unit 42 by performing operations on the screen of the display unit 42 with a finger or the like. The display unit 42 is, for example, a compact LCD or an organic EL display.

The operating unit 43 includes a keyboard with keys for inputting letters, numbers, or spaces, enter keys, arrow keys, and the like, and includes a power button and the like. In the following, an explanation is given based on the assumption that the operating unit 43 of the wireless device 3 is operated by a staff of the shop (hereinafter, described as a shop staff) in which the wireless device 3 is installed; however, in some cases, a manager of the shop or the like may operate the operating unit 43.

The storage unit 44 is a storage device, such as a semiconductor memory device including a RAM, a flash memory, or the like, a hard disk, or a memory card. The storage unit 44 stores therein, for example, an OS, programs of the member's numbered ticket issuing application acquired from the numbered ticket information issuing server 4, and the like.

The storage unit 44 stores therein, for example, screen information, setting information, numbered ticket information, and the like. These pieces of the information are set and updated in the storage unit 44 when the control unit 45 executes the member's numbered ticket issuing application. The screen information includes, for example, information on layouts of various screens to be described later, and is used to generate the various screens to be described later.

The control unit 45 is realized by, for example, an integrated circuit, such as an ASIC or an FPGA. When the programs stored in the storage unit 44 are executed by, for example, a CPU, an MPU, or the like by using an internal RAM (not illustrated) as a work area, the control unit 45 realizes or executes functions and operations of information processing to be described later.

Specifically, the control unit 45 executes the member's numbered ticket issuing application whose program data is stored in the storage unit 44, to thereby function as an identification information setting unit 51, an information transmitting unit 52, an information receiving unit 53, and a display control unit 54. Incidentally, the configuration of the control unit 45 is not limited to the above example, and other configurations are applicable as long as they perform information processing to be described later.

The identification information setting unit 51 acquires an ID change request transmitted from the numbered ticket information issuing server 4 via the second wireless communication unit 41. The identification information setting unit 51 sets, in the first wireless communication unit 40, a wireless device ID contained in the ID change request. Accordingly, a wireless signal containing the wireless device ID set by the identification information setting unit 51 is output from the first wireless communication unit 40.

Incidentally, the identification information setting unit 51 may generate a unique wireless device ID at random or according to a predetermined rule, at predetermined time intervals (for example, every 30 minutes). In this case, the identification information setting unit 51 sets the generated wireless device ID in the first wireless communication unit 40, and transmits it to the numbered ticket information issuing server 4 via the first wireless communication unit 40. Meanwhile, the identification information setting unit 51 can generate the wireless device ID such that duplicate among the wireless devices 3 is not taken into account, by, for example, adding a shop ID to the information that is generated at random or according to the predetermined rule.

The information transmitting unit 52 transmits various types of information to the numbered ticket information issuing server 4. The information transmitted to the numbered ticket information issuing server 4 includes, for example, a member registration request, a shop registration request, a ticketing start request, a numbered ticket issue request, a numbered ticket list information request, a call request, a numbered ticket acceptance request, a numbered ticket cancel request, and the like.

The information receiving unit 53 acquires various types of information transmitted from the numbered ticket information issuing server 4, and stores the acquired information in the storage unit 44. The information transmitted from the numbered ticket information issuing server 4 includes, for example, shop list information, shop registration information, numbered ticket list information, an ID change request, and the like, and these pieces of the information are stored in the storage unit 44 by the information receiving unit 53.

The display control unit 54 controls display of the display unit 42 based on an operation on the operating unit 43 by a shop staff (hereinafter, described as a staff operation). FIGS.

7A, 7B, and 8A to 8C are diagrams illustrating examples of screens displayed on the display unit 42 by the display control unit 54.

Figure 7A:
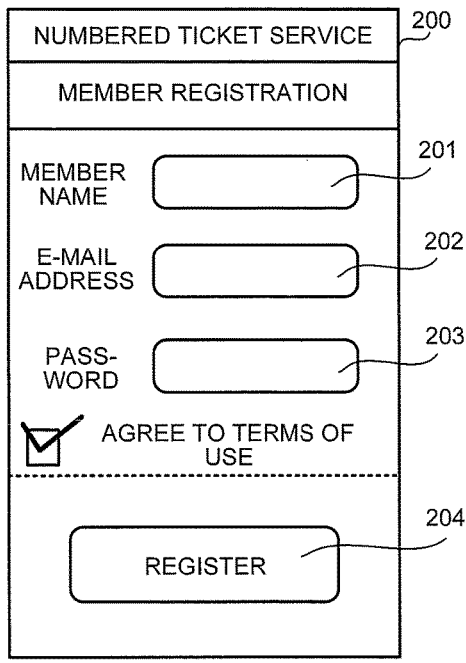

FIG. 7A is a diagram illustrating an example of a member registration screen. As illustrated in FIG. 7A, a member registration screen 200 contains a member name input area 201, an e-mail address input area 202, a password input area 203, and a registration operation area 204. The display control unit 54 displays the member registration screen 200 on the display unit 42 based on the screen information stored in the storage unit 44.

The shop staff operates the operating unit 43 to input a member name, an e-mail address, and a password respectively to the member name input area 201, the e-mail address input area 202, and the password input area 203, and selects the registration operation area 204. When the registration operation area 204 is operated, the information transmitting unit 52 transmits a member registration request containing the member name, the e-mail address, and the password to the numbered ticket information issuing server 4.

The numbered ticket information issuing server 4 transmits shop list information to the wireless device 3 according to the member registration request. The shop list information is received by the information receiving unit 53, and a shop list screen corresponding to the shop list information is displayed on the display unit 42 by the display control unit 54.

Figure 7B:
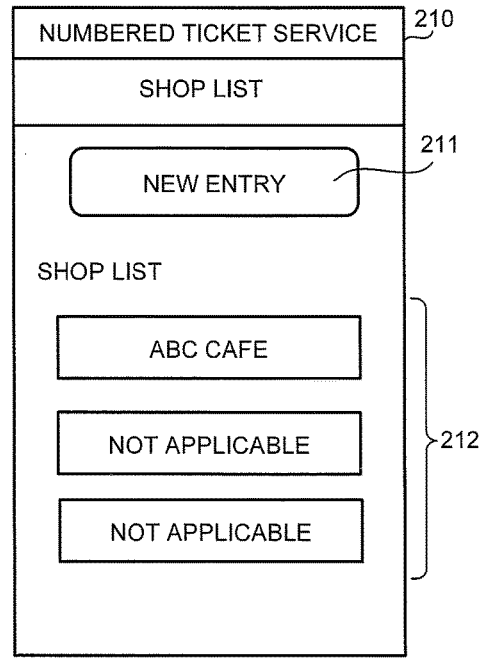

FIG. 7B is a diagram illustrating an example of the shop list screen. As illustrated in FIG. 7B, a shop list screen 210 contains a new entry operation area 211 and a shop selection area 212. When the shop staff selects the new entry operation area 211 by an operation on the operating unit 43 (hereinafter, described as a staff operation), the display control unit 54 displays a shop registration screen on the display unit 42.

FIG. 8A is a diagram illustrating an example of the shop registration screen. As illustrated in FIG. 8A, a shop registration screen 220 contains a shop name input area 221, an address input area 222, an option input area 223, and a registration operation area 224.

By a staff operation, a shop name and an address are respectively input to the shop name input area 221 and the address input area 222, and an option in the option input area 223 is selected. Options contained in the option input area 223 are information selectable by the user U, and in the example illustrated in FIG. 8A, "number of persons", "smoking", and "seat" are provided.

After the above described information is input to the shop list screen, if the registration operation area 224 is selected by a staff operation, the information transmitting unit 52 transmits a shop registration request containing information on the shop name, the address, the option, and the like to the numbered ticket information issuing server 4. Meanwhile, although not illustrated in the drawings, the shop registration screen contains areas for inputting business hours and other information, and these pieces of the information are also contained in the shop registration request.

The numbered ticket information issuing server 4 transmits shop registration information according to the shop registration request, and the information receiving unit 53 receives the shop registration information. The display control unit 54 displays a ticketing start screen on the display unit 42 based on the shop registration information received by the information receiving unit 53.

FIG. 8B is a diagram illustrating an example of the ticketing start screen. As illustrated in FIG. 8B, a ticketing start screen 230 contains a shop registration information display area 231 and a ticketing operation area 232. When the ticketing operation area 232 is selected by a staff operation, the information transmitting unit 52 transmits a ticketing start request containing the shop ID to the numbered ticket information issuing server 4, and the display control unit 54 shifts a display screen of the display unit 42 to the shop list screen 210.

In the shop list screen 210, when a shop is selected by a staff operation on the shop selection area 212, the information transmitting unit 52 sends a numbered ticket list information request to the numbered ticket information issuing server 4. When the numbered ticket information issuing server 4 transmits numbered ticket list information to the wireless device 3 according to the numbered ticket list information request, the information receiving unit 53 receives the numbered ticket list information and stores it in the storage unit 44. The display control unit 54 displays a numbered ticket list screen on the display unit 42 based on the numbered ticket list information stored in the storage unit 44.

FIG. 8C is a diagram illustrating an example of the numbered ticket list screen. As illustrated in FIG. 8C, a numbered ticket list screen 240 includes numbered ticket information areas 241a to 241e. The numbered ticket information areas 241a to 241e contain numbered ticket information display areas 242a to 242e and call operation display areas 243a to 243e. In the numbered ticket information display areas 242a to 242e, numbered ticket information are displayed. In the example illustrated in FIG. 8C, a numbered ticket number, the number of persons, smoking, and seat are contained as the numbered ticket information.

In the call operation display areas 243a to 243e, information on call states or call operation buttons are arranged. For example, in the call operation display area 243a, information indicating that a call for the wireless terminal 2 has been completed and that the order of acceptance is the first is displayed as a call state. In the call operation display area 243b, information indicating completion of acceptance is displayed as a call state. In the call operation display areas 243c to 243e, call operation buttons are displayed.

When the call operation button in any of the call operation display areas 243c to 243e is selected by a staff operation (for example, double click), the information transmitting unit 52 transmits a call request corresponding to the selected call operation button to the numbered ticket information issuing server 4. The call request contains, for example, a terminal ID or a serial number of a target of the call, and accordingly, the numbered ticket information issuing server 4 identifies the wireless terminal 2 to be the target of the call.

Furthermore, when a staff operation (for example, flicking) indicating completion of acceptance corresponding to any of the call operation display areas 243c to 243e is performed, the information transmitting unit 52 transmits a numbered ticket acceptance request corresponding to the completion of the acceptance to the numbered ticket information issuing server 4. Accordingly, numbered ticket list information, in which the call operation display area for the completion of the acceptance is changed, is transmitted by the numbered ticket information issuing server 4 and is received by the information receiving unit 53, and, the numbered ticket list screen 240, in which information indicating the completion of the acceptance is contained in the call operation display area corresponding to the completion of the acceptance, is displayed on the display unit 42 by the display control unit 54.

Furthermore, if a staff operation (for example, triple click operation) for cancelling any of the call operation display areas 243c to 243e is performed, the information transmitting unit 52 transmits a numbered ticket cancel request containing information to be cancelled to the numbered ticket information issuing server 4. Accordingly, numbered ticket list information, in which the call operation display area to be cancelled is deleted, is transmitted from the numbered ticket information issuing server 4 and is received by the information receiving unit 53, and, the numbered ticket list screen 240 corresponding to the changed numbered ticket list information is displayed on the display unit 42 by the display control unit 54.

Meanwhile, although not illustrated in the drawings, the display control unit 54 may display a numbered ticket issue request screen on the display unit 42. The numbered ticket issue request screen contains, for example, a customer information input area for inputting information on a name of a customer who visits a shop, a phone number, the number of persons, smoking, seat, and the like and contains a numbered ticket issue request operation area.

When input to the customer information input area and a numbered ticket issue request operation are performed by an operation on the operating unit 43 by the shop staff or a customer who visits the shop, the information receiving unit 53 transmits a numbered ticket issue request to the numbered ticket information issuing server 4 via the second wireless communication unit 41. The numbered ticket issue request contains, in addition to the information input to the customer information input area, the wireless device ID stored in the storage unit 44 and a shop ID of a shop corresponding to the numbered ticket issue request operation. Therefore, it becomes possible to issue the numbered ticket information to a customer who visits a shop but who does not have the wireless terminal 2.

1.5. Numbered Ticket Information Issuing Server 4

Figures 9, 10:
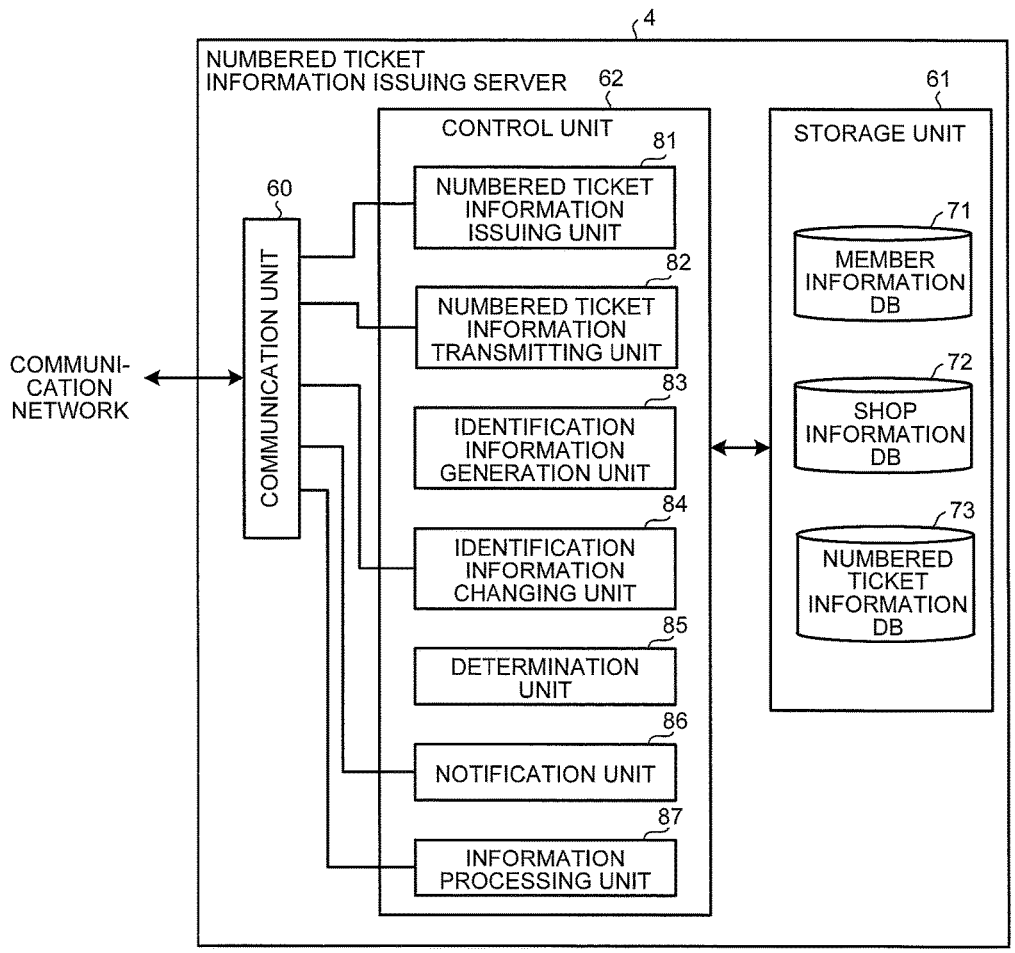
FIG. 9 is a diagram illustrating an example of a configuration of a numbered ticket information issuing server.
FIG. 10 is a diagram illustrating an example of a member information table.

A configuration of the numbered ticket information issuing server 4 will be described in detail below. FIG. 9 is a diagram illustrating an example of the configuration of the numbered ticket information issuing server 4. As illustrated in FIG. 9, the numbered ticket information issuing server 4 includes a communication unit 60, a storage unit 61, and a control unit 62.

The communication unit 60 is, for example, an interface, such as an NIC. The control unit 62 transmits and receives various types of information to and from the wireless terminal 2 and the wireless device 3 via the communication unit 60 and the communication network 6.

1.5.1. Storage Unit 61

The storage unit 61 includes a member information DB 71, a shop information DB 72, and a numbered ticket information DB 73.

The member information DB 71, the shop information DB 72, and the numbered ticket information DB 73 are, for example, semiconductor memory devices, such as RAMs or flash memories, or storage devices, such as hard disks. Incidentally, the member information DB 71, the shop information DB 72, and the numbered ticket information DB 73 may be formed as a single DB. Furthermore, while various IDs are represented by simple letters and numbers for convenience of explanation, any others are applicable as long as they are distinguishable from other information.

In the following, various types of information stored in each of the DBs 71 to 73 will be described first, and thereafter, units 81 to 87 of the control unit 62 will be descried in detail.

First, various tables stored in the member information DB 71, the shop information DB 72, and the numbered ticket information DB 73 will be described.

Member Information Table

The member information DB 71 stores therein a member information table. FIG. 10 is a diagram illustrating an example of the member information table. As illustrated in FIG. 10, the member information table is information in which a "member ID", a "member name", an "e-mail address", and a "password" are associated with one another.

The "member ID" is identification information on a member, which is assigned by the control unit 62 according to the member registration request transmitted from the wireless device 3 to the numbered ticket information issuing server 4. Furthermore, the "member name", the "e-mail address", and the "password" are information contained in the member registration request, and set in the member information table by the control unit 62.

Shop Information Table

The shop information DB 72 stores therein a shop information table. FIG. 11 is a diagram illustrating an example of the shop information table. As illustrated in FIG. 11, the shop information table is information in which pieces of information such as a "shop ID", a "member ID", a "shop name", an "address", "optional information", "business hours" and a "wireless device ID" are associated with one another.

The "shop ID" is identification information on a shop, which is assigned by the control unit 62 according to the shop registration request transmitted from the wireless device 3 to the numbered ticket information issuing server 4. Furthermore, the "shop name", the "address", the "optional information", and the "business hours" are information contained in the shop registration request, and set in the shop information table by the control unit 62.

The "member ID" is the same as the "member ID" illustrated in FIG. 10, and is identification information on a member who has a target shop of the shop registration request. The "wireless device ID" is the wireless device ID of the wireless device 3, which is set in the wireless device 3 by the control unit 62.

Numbered Ticket Information Table

The numbered ticket information DB 73 stores therein a numbered ticket information table. FIG. 12 is a diagram illustrating an example of the numbered ticket information table. As illustrated in FIG. 12, the numbered ticket information table is information in which pieces of information such as a "shop ID", a "terminal ID", a "waiting order", a "numbered ticket number", an "expiry date", the "number of persons", "smoking", "seat", and a "call state" are associated with one another.

The "terminal ID" is identification information assigned to the wireless terminal 2 by the control unit 62. The terminal ID is assigned by the control unit 62 according to a registration request transmitted from the wireless terminal 2, is set in the numbered ticket information table, and is notified to the wireless terminal 2. The information transmitted from the wireless terminal 2 contains a terminal ID, and accordingly, the control unit 62 can identify the wireless terminal 2.

The "waiting order" is a number indicating the order in which the user U of the wireless terminal 2 waits for a turn. The smaller the "waiting order" is, the shorter the wait time. The "waiting order" is determined by the control unit 62 and is set in the numbered ticket information table. The "expiry date" is an expiry date of the numbered ticket information issued to the wireless terminal 2. The "expiry date" is set by the control unit 62.

The "numbered ticket number" is a number of the numbered ticket assigned to the wireless terminal 2. The "numbered ticket number" is assigned by the control unit 62 according to a predetermined rule or at random so that, for example, a duplicate number is not assigned to the users U in wait states.

The "number of persons", the "smoking" and the "seat" are optional information, and set by the control unit 62 based on information contained in the numbered ticket issue request. A field of the "number of persons" indicates the number of persons applied to the numbered ticket information. In a field of the "smoking", "0" indicates "no smoking", "1" indicates "smoking", and "2" indicates "either is fine". In a field of the "seat", "0" indicates a "table", "1" indicates a "counter", and "2" indicates "either is fine".

In the "call state", information on a call state of the wireless terminal 2 is set. For example, in the example illustrated in FIG. 12, "uncalled" is set when a call to the wireless terminal 2 has not been performed, "called" is set when a call to the wireless terminal 2 is completed, and "acceptance completed" is set when a call to and acceptance of the wireless terminal 2 are completed.

Incidentally, while the numbered ticket information table contains past numbered ticket information for which acceptance has been completed as illustrated in FIG. 12, it may be possible to store the past numbered ticket information in a numbered ticket history table (not illustrated) stored in the numbered ticket information DB 73.

1.5.2. Control Unit 62

The control unit 62 includes a numbered ticket information issuing unit 81, a numbered ticket information transmitting unit 82, an identification information generation unit 83, an identification information changing unit 84, the determination unit 85, a notification unit 86, and the information processing unit 87.

The control unit 62, when programs stored in an internal storage device are executed by an internal CPU or MPU by using a RAM as a work area, functions as the numbered ticket information issuing unit 81, the numbered ticket information transmitting unit 82, the identification information generation unit 83, the identification information changing unit 84, the determination unit 85, the notification unit 86, and the information processing unit 87. The configuration of the control unit 62 is not limited to the above configuration, and other configurations are applicable as long as they perform information processing to be described later.

1.5.2.1. Numbered Ticket Information Issuing Unit 81

The numbered ticket information issuing unit 81 issues, upon receiving a numbered ticket issue request from the wireless terminal 2 via the communication unit 60, numbered ticket information on a shop corresponding to the numbered ticket issue request.

Specifically, when the numbered ticket issue request from the wireless terminal 2 is received, and if a combination of a shop ID and a wireless device ID contained in the numbered ticket issue request is contained in the shop information table, the numbered ticket information issuing unit 81 decides to issue numbered ticket information. For example, it is assumed that the shop information table is in the state illustrated in FIG. 11. In this case, if a combination of a shop ID of "A1" and a wireless device ID of "ueisp00223" is contained in the numbered ticket issue request, the numbered ticket information issuing unit 81 decides to issue the numbered ticket information. In contrast, if a combination of a shop ID and a wireless device ID set in the shop information table is not contained in the numbered ticket issue request, the numbered ticket information issuing unit 81 decides not to issue the numbered ticket information.

Therefore, the numbered ticket information is issued on condition that the user U of the wireless terminal 2 goes to the wireless communication area 5 of the wireless device 3 installed in a shop for which the numbered ticket information is to be acquired. In other words, when an issue request operation for numbered ticket information is performed in a place distant from the shop, the numbered ticket information is not issued. Consequently, it becomes possible to prevent unfairness between the user U who acquires numbered ticket information by the wireless terminal 2 and a user who acquires numbered ticket information by the wireless device 3.

The numbered ticket information issuing unit 81 determines a "numbered ticket number" according to a predetermined rule or at random so that a duplicate number is not assigned to the users U in wait states. For example, the numbered ticket information issuing unit 81 may employ, as the numbered ticket number, a number incremented by one at every issuance of the numbered ticket information.

The numbered ticket information issuing unit 81 determines an "expiry date" of the numbered ticket information. For example, the numbered ticket information issuing unit 81 changes the "expiry date" according to a degree of congestion in the shop to be a target of the numbered ticket information. Specifically, the numbered ticket information issuing unit 81 sets the "expiry date" such that a time limit is extended as the degree of congestion in the shop increases. The degree of congestion in a "degree of congestion in shop" is determined by the determination unit 85 according to the number of pieces of numbered ticket information with "uncalled" associated with the shop ID corresponding to the numbered ticket issue request in the numbered ticket information table.

Upon determining the "numbered ticket number" and the "expiry date", the numbered ticket information issuing unit 81 sets the "numbered ticket number" and the "expiry date" as well as the member ID, the shop ID, the shop name, the address, the optional information, the business hours, and the like contained in the numbered ticket issue request, in the numbered ticket information table in an associated manner. Furthermore, the numbered ticket information issuing unit 81 also sets a member ID corresponding to the shop ID in the numbered ticket information table. Incidentally, the numbered ticket information issuing unit 81 may set an issue time of the numbered ticket information in association with each terminal ID in the numbered ticket information table.

The numbered ticket information issuing unit 81 starts to issue the numbered ticket information upon receiving the ticketing start request from the wireless device 3, and stops issuance of the numbered ticket information upon receiving a ticketing start stop from the wireless device 3. Incidentally, the numbered ticket information issuing unit 81 may start and stop issuance of the numbered ticket information based on the business hours set in the shop information table.

For example, the numbered ticket information issuing unit 81 may set a period starting from a predetermined time T1 before a business start time until a predetermined time T2 before a business end time as a period for issuing the numbered ticket information. Incidentally, the numbered ticket information issuing unit 81 may increase the predetermined times T1 and T2 when the number of the users U around the shop is large, and may decrease the predetermined times T1 and T2 when the number of the users U around the shop is small. Consequently, it becomes possible to more appropriately issue the numbered ticket information. Meanwhile, the numbered ticket information issuing unit 81 may change the predetermined times T1 and T2 by, for example, using, as the number of the users U around the shop, the number of the wireless terminals 2 that transmit wireless device IDs associated with the shop ID.

1.5.2.2. Numbered Ticket Information Transmitting Unit 82

The numbered ticket information transmitting unit 82 transmits, via the communication unit 60, the numbered ticket information issued by the numbered ticket information issuing unit 81 to the wireless terminal 2 that is a transmission source of the numbered ticket issue request.

Furthermore, upon the numbered ticket list information request from the wireless device 3, the numbered ticket information transmitting unit 82 extracts all pieces of numbered ticket information corresponding to the shop ID contained in the numbered ticket list information request from the numbered ticket information table, and transmits numbered ticket list information containing the extracted pieces of the numbered ticket information to the wireless device 3.

1.5.2.3. Identification Information Generation Unit 83

The identification information generation unit 83 generates a wireless device ID of each of the wireless devices 3. For example, the identification information generation unit 83 generates wireless device IDs that are not duplicate among the wireless devices 3 at random or according to a predetermined rule, at predetermined time intervals (for example, every 30 minutes). The wireless device ID is, for example, identification information configured of letters and numbers.

1.5.2.4. Identification Information Changing Unit 84

The identification information changing unit 84, every time the identification information generation unit 83 generates a wireless device ID, transmits an ID change request containing the generated wireless device ID to the corresponding wireless device 3 via the communication unit 60. Consequently, the wireless device ID of the wireless device 3 is changed.

Furthermore, the identification information changing unit 84 sets the wireless device ID generated by the identification information generation unit 83 in the shop information table. Incidentally, if the wireless device 3 generates the wireless device ID, the identification information changing unit 84 acquires the wireless device ID from the wireless device 3 and sets it in the shop information table.

Figure 13:
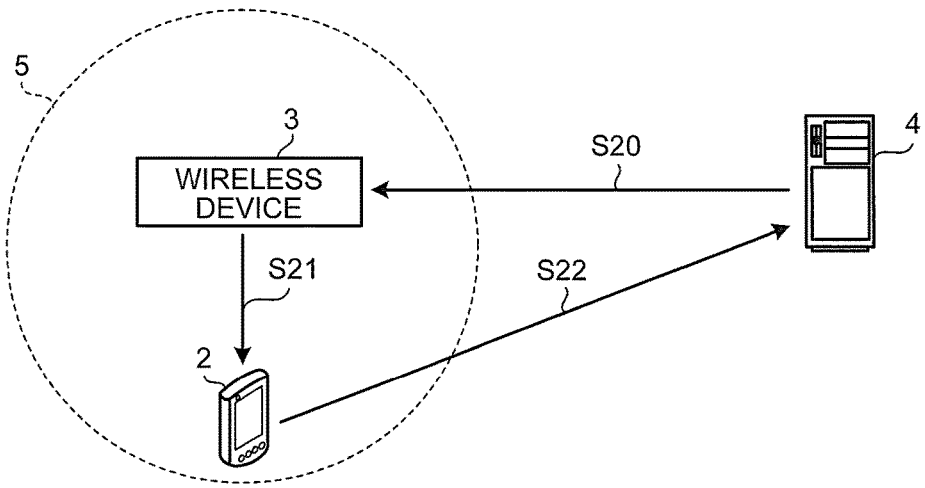
FIG. 13 is a diagram illustrating exchange of a wireless device ID among the wireless terminal, the wireless device, and the numbered ticket information issuing server.

FIG. 13 is a diagram illustrating exchange of the wireless device ID among the wireless terminal 2, the wireless device 3, and the numbered ticket information issuing server 4. As illustrated in FIG. 13, when the identification information changing unit 84 transmits a new wireless device ID to the wireless device 3 (Step S20), the wireless device 3 adds the new wireless ID acquired from the numbered ticket information issuing server 4 to a wireless signal and outputs it to the wireless communication area 5 (Step S21).

The wireless device ID that the wireless terminal 2 receives from the wireless device 3 is the new wireless device ID, and a numbered ticket issue request containing the new wireless device ID is transmitted from the wireless terminal 2 to the numbered ticket information issuing server 4 (Step S22).

In this manner, the wireless device ID is periodically changed by the numbered ticket information issuing server 4, and therefore, it becomes possible to prevent a fraudulent numbered ticket issue request from the wireless terminal 2 that has not visited the shop and improve the security.

Incidentally, if it is desired to improve the security, the frequency of a change in the wireless device ID is increased. The frequency of the change in the wireless device ID can be changed, for example, for each shop ID.

Figure 14:
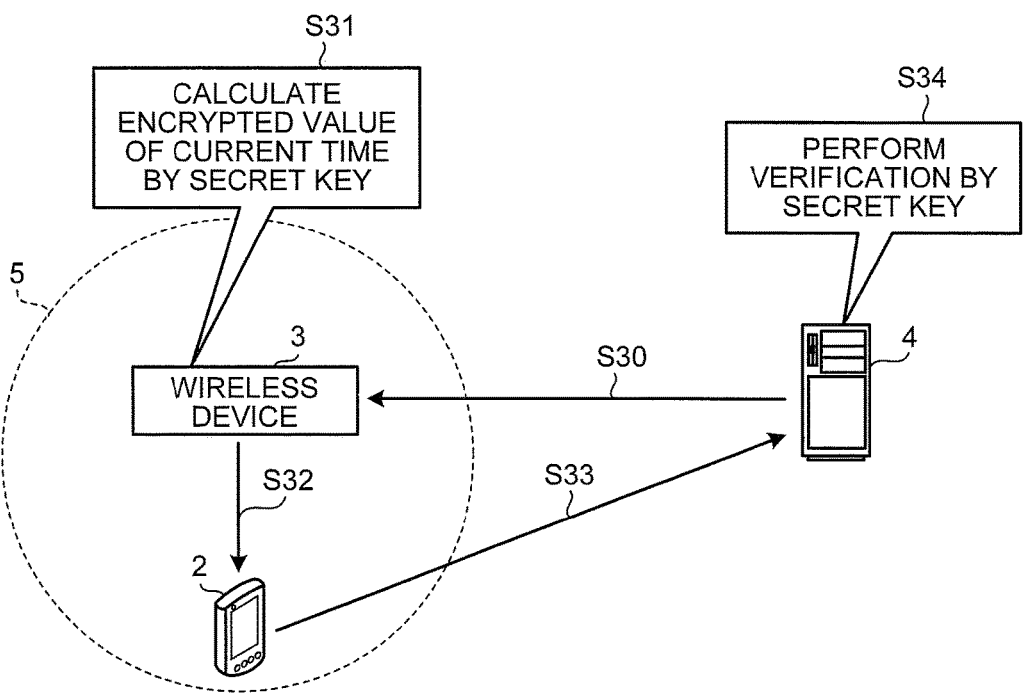
FIG. 14 is a diagram illustrating generation and exchange of a wireless device ID using a secret key.

Furthermore, the identification information changing unit 84 can cause the wireless device 3 to output a random wireless device ID by using a secret key, instead of the wireless device ID generated by the identification information generation unit 83. FIG. 14 is a diagram illustrating generation and exchange of a wireless device ID using a secret key.

As illustrated in FIG. 14, the identification information changing unit 84 generates or select a secret key unique to a shop, transmits it to the wireless device 3 (Step S30), and sets it in the shop information table. The control unit 45 of the wireless device 3 calculates an encrypted value of a current time by the received secret key (Step S31), and outputs a calculation result as the wireless device ID to the wireless terminal 2 (Step S32).

The time encrypted by the wireless device 3 is, for example, "xx year, xx month, xx day, xx o'clock, xx minutes", and in this case, the wireless device ID can be changed on the minute time scale. Meanwhile, the time encrypted by the wireless device 3 may be, "xx year, xx month, xx day, xx o'clock", and in this case, the wireless device ID can be changed on the hour time scale. Furthermore, "xx year, xx month, xx day, xx o'clock, xx minutes, xx seconds" may be employed, and in this case, the wireless device ID can be changed on the second time scale.

The wireless device ID that the wireless terminal 2 receives from the wireless device 3 is a wireless device ID to be changed on the minute time scale or on the hour time scale, and a numbered ticket issue request containing the wireless device ID is transmitted from the wireless terminal 2 to the numbered ticket information issuing server 4 (Step S33). The numbered ticket information issuing unit 81 verifies the numbered ticket issue request transmitted from the wireless terminal 2 by a secret key (Step S34). Specifically, the numbered ticket information issuing unit 81 acquires, from the shop information table, a secret key of the shop corresponding to the wireless device ID contained in the numbered ticket issue request, and if a decrypted value of the wireless device ID using the acquired secret key matches the current time, the numbered ticket information is issued.

In this manner, the wireless device ID is periodically changed even when the secret key is used, and therefore, it becomes possible to prevent a fraudulent numbered ticket issue request from the wireless terminal 2 that has not visited the shop and improve the security. Incidentally, if it is desired to improve the security, the frequency of a change in the wireless device ID is increased. The frequency of the change in the wireless device ID can be changed, for example, for each shop ID.

1.5.2.5. Determination Unit 85

When the numbered ticket information is changed, the determination unit 85 determines a waiting order and a wait time of the shop corresponding to the numbered ticket information transmitted to the wireless terminal 2. For example, upon a numbered ticket acceptance request from the wireless terminal 2 or the wireless device 3, a "call state" in the numbered ticket information corresponding to the numbered ticket acceptance request is changed to "acceptance completed"; therefore, in this case, the determination unit 85 determines that there is a change in the numbered ticket information. Furthermore, for example, when the numbered ticket information is cancelled, a waiting order is changed; therefore, the determination unit 85 determines that there is a change in the numbered ticket information. Incidentally, if an object provided by the shop is a service, the waiting order determined by the determination unit 85 is an order in which the service is provided, and, if an object provided by the shop is a product, the waiting order determined by the determination unit 85 is an order in which the product is provided.

The determination unit 85 determines, for each shop ID, a waiting order and a wait time of the user U of the wireless terminal 2 corresponding to each terminal ID based on the numbered ticket information table. For example, the determination unit 85 determines, for each shop ID, the waiting order of each of the users U based on the numbered ticket number of the wireless terminal 2 with a call state of "uncalled".

For example, it is assumed that the numbered ticket information table is in the state illustrated in FIG. 12. In this case, the determination unit 85 determines that the waiting order of the user U corresponding to a terminal ID of "T001" related to the smallest numbered ticket number among the wireless terminals 2 with call states of "uncalled" is "1", and determines that the waiting order of the user U corresponding to a terminal ID of "T098" related to the second smallest numbered ticket number is "2". The waiting orders of the users U of the other wireless terminals 2 with call states of "uncalled" are determined by the same process.

The determination unit 85 deletes, from the numbered ticket information table, numbered ticket information corresponding to the wireless terminal 2 for which the expiry date has passed among the wireless terminals 2 with call states of "called", and transmits the numbered ticket expiry information to the wireless terminal 2 that has acquired the deleted numbered ticket information. Consequently, it becomes possible to prevent the numbered ticket information whose expiry date has passed from being used.

Incidentally, if the numbered ticket information issuing unit 81 sets the period for issuing the numbered ticket information in each piece of the numbered ticket information in the numbered ticket information table, the determination unit 85 may obtain the waiting order of each of the users U in chronological order of the issue time of the numbered ticket information. By doing this, even when the numbered ticket information issuing unit 81 randomly assigns the numbered ticket numbers, it becomes possible to determine the waiting order with high accuracy.

Furthermore, the determination unit 85 can determine, for each shop ID, the wait time of the user U based on the waiting order of the user U and an average wait time. For example, the determination unit 85 multiplies the waiting order and the average wait time to obtain a wait time. The average wait time is, for example, a wait time per user group. If the average wait time is 10 minutes, because the waiting order of the user U of the wireless terminal 2 with the terminal ID of "T076" is "3", the wait time is determined as "30 minutes". The determination unit 85 can use, as the average wait time, an initial value set in the storage unit 61 by a staff operation, and thereafter, learn the average wait time based on intervals of a call notification or the like.

Furthermore, the determination unit 85 sets a waiting order and a wait time of the user U with the largest waiting order as the number of waiting groups and a wait time in a shop. Incidentally, the determination unit 85 can also determine a waiting order and a wait time in the shop for a user U who acquires numbered ticket information next, by adding the average wait time and one respectively to the wait time and the waiting order of the user U with the largest waiting order in the shop.

Furthermore, the determination unit 85 can determine the waiting order of each of the users U according to the degree of presence of the users U in the wireless communication area 5 of the wireless device 3 installed in a target shop of the numbered ticket information, in addition to the numbered ticket number. Namely, the determination unit 85 can determine the waiting order of each of the users U based on the frequency at which the wireless device ID corresponding to the shop ID is transmitted from the wireless terminals 2 of the users U waiting for a turn. In this determination, a congestion setting mode and a congestion avoidance mode are provided, and these modes can be set for each shop ID.

First, the congestion setting mode will be described. The determination unit 85 determines the frequency at which a wireless device ID that matches with the wireless device ID corresponding to the shop ID set in the congestion setting mode is transmitted from the wireless terminal 2 with the terminal ID associated with the shop ID. Then, the determination unit 85 determines a waiting order such that the priority is increased as the determined transmission frequency increases.

For example, a case will be described in which waiting orders in the shop corresponding to the shop ID of "A1" are determined when the shop information table is in the state illustrated in FIG. 11 and the numbered ticket information table is in the state illustrated in FIG. 12. In this case, the determination unit 85 obtains, for example, a weighting value that decreases with an increase in the transmission frequency of the wireless device ID of "ueisp00223" per predetermined time, and re-determines waiting orders that have been obtained based on the numbered ticket numbers or the issue times as described above.

For example, the determination unit 85 arranges multiplied values of waiting orders and the weighting value in ascending order, and re-determines the waiting orders such that the waiting orders increase as the multiplied values increase. Incidentally, it is satisfactory if the waiting order of the user U with higher degree of presence around the target shop of the numbered ticket information can be reduced preferentially, and, the determination unit 85 may re-determine the waiting orders by other methods or may determine the waiting orders by single determination without separating determination and re-determination of the waiting orders.

In this manner, in the congestion setting mode, the waiting order of the user U with higher degree of presence around the target shop of the numbered ticket information is reduced preferentially; therefore, for example, by setting the congestion setting mode for a newly opened shop, it becomes possible to notify passersby that the shop is booming.

Next, the congestion avoidance mode will be described. The determination unit 85 determines the frequency at which a wireless device ID that matches with the wireless device ID corresponding to the shop ID set in the congestion avoidance mode is transmitted from the wireless terminal 2 with the terminal ID associated with the shop ID. Then, the determination unit 85 obtains a waiting order such that the priority increases as the determined transmission frequency decreases.

For example, a case will be described in which waiting orders in the shop corresponding to the shop ID of "A1" are determined when the shop information table is in the state illustrated in FIG. 11 and the numbered ticket information table is in the state illustrated in FIG. 12. In this case, the determination unit 85 obtains, for example, a weighting value that decreases with a decrease in the transmission frequency of the wireless device ID of "ueisp00223" per predetermined time, and re-determines waiting orders that have been obtained based on the numbered ticket numbers or the issue times as described above.

For example, the determination unit 85 arranges multiplied values of waiting orders and the weighting value in ascending order, and re-determines the waiting orders such that the waiting orders increase as the multiplied values increase. Incidentally, it is satisfactory if the waiting order of the user U with lower degree of presence around the target shop of the numbered ticket information can be reduced preferentially, and, the determination unit 85 may re-determine the waiting orders by other methods or may determine the waiting orders by single determination without separating determination and re-determination of the waiting orders.

In this manner, in the congestion avoidance mode, the waiting order of the user U with lower degree of presence around the target shop of the numbered ticket information is reduced preferentially; therefore, for example, by setting the congestion avoidance mode, it becomes possible to avoid congestion around the shop.

1.5.2.6. Notification Unit 86

The notification unit 86, when receiving a call request from the wireless device 3 or when it is determined that the waiting order determined by the determination unit 85 falls within a predetermined range, performs a call notification on the wireless terminal 2. For example, the notification unit 86 transmits call notification information to the wireless terminal 2 of the user U whose waiting order has reached "3" or lower. Therefore, it becomes possible to notify the user U whose waiting order has reached "3" or lower that the user's turn is coming.

Furthermore, the notification unit 86 can determine the wireless terminal 2 to which a call notification is to be performed, based on a current location of the wireless terminal 2 in addition to the waiting order. For example, the notification unit 86 can perform a call notification with a higher priority with an increase in a distance between the target shop of the numbered ticket information and the current location of the wireless terminal 2 (hereinafter, described as a separate distance).

Specifically, the notification unit 86 obtains a weighting value that increases with a decrease in the separate distance, and multiples waiting orders by the weighting value. The notification unit 86 transmits the call notification information to the wireless terminals 2 of the users U for which results of the multiplication are equal to or smaller than a predetermined value. In this manner, by performing the call notification early when the separate distance is far, it becomes possible to cause the user U to visit the shop at an appropriate timing.

Incidentally, the notification unit 86 can obtain a travel time from the current location of the wireless terminal 2 to the target shop of the numbered ticket information instead of the separate distance, and perform a call notification with a higher priority with an increase in the travel time. In this manner, by performing the call notification early when the travel time is long, it becomes possible to cause the user U to visit the shop at an appropriate timing.

For example, histories of the location information on the wireless terminal 2 since issuance of the numbered ticket information are stored in the storage unit 61, and the notification unit 86 can determine a means of transportation for the user U of the wireless terminal 2 based on the histories of the location information and obtain a travel time. For example, the notification unit 86 obtains a travel route and a travel speed of the user U from the histories of the location information on the wireless terminal 2, obtains a means of transportation (for example, a car, a public transport, or a walk) based on these information, and obtains a travel time to the target shop of the numbered ticket information by using the means of transportation.

Incidentally, when determining that it is difficult for the user U to visit the shop before the expiry date of the numbered ticket information based on the separate distance or the travel time, the notification unit 86 may transmit the numbered ticket expiry information to the wireless terminal 2 of the corresponding user U and delete the numbered ticket information on the corresponding user U from the numbered ticket information table.

Furthermore, when it is determined that the waiting order determined by the determination unit 85 has reached "1", the notification unit 86 transmits the wait end information to the wireless terminal 2. Moreover, when there is a change in the numbered ticket information, the notification unit 86 transmits the changed numbered ticket information to the wireless device 3. Therefore, the numbered ticket list screen 240 can be set to the latest state in the wireless device 3.

1.5.2.7. Information Processing Unit 87

The information processing unit 87 performs processes according to requests from the wireless terminal 2. For example, when receiving a shop list information request from the wireless terminal 2, the information processing unit 87 extracts, from the numbered ticket information table, numbered ticket information corresponding to a shop ID of a shop within a geographical range contained in the shop list information request, generates numbered ticket list information containing the extracted numbered ticket information, and transmits it to the wireless terminal 2 being a request source.

Furthermore, when receiving a shop information request from the wireless terminal 2, the information processing unit 87 extracts, from the shop information table, shop information corresponding to the shop ID contained in the shop information request, and transmits it to the wireless terminal 2 being a request source.

Moreover, when receiving a numbered ticket cancel request from the wireless terminal 2 or the wireless device 3, the information processing unit 87 deletes, from the numbered ticket information table, numbered ticket information containing the shop ID and the numbered ticket number (or the terminal ID) contained in the numbered ticket cancel request among pieces of numbered ticket information set in the numbered ticket information table.

Furthermore, when receiving a numbered ticket reissue request from the wireless terminal 2, the information processing unit 87 extracts, from the storage unit 61, the latest past numbered ticket information containing the terminal ID and the shop ID contained in the numbered ticket reissue request, changes the expiry date of the extracted numbered ticket information, and sets it in the numbered ticket information table. The information processing unit 87 transmits the numbered ticket information set in the numbered ticket information table to the wireless terminal 2 being a request source.

Moreover, when receiving a numbered ticket acceptance request from the wireless terminal 2 or the wireless device 3, the information processing unit 87 changes a "call state" of numbered ticket information corresponding to the numbered ticket acceptance request to "acceptance completed" in the numbered ticket information table. The information processing unit 87 transmits acceptance information corresponding to the numbered ticket acceptance request to the wireless terminal 2 being a request source.

Incidentally, the numbered ticket acceptance request contains, for example, a shop ID and a numbered ticket number, and the information processing unit 87 specifies numbered ticket information in the numbered ticket information table based on the information contained in the numbered ticket acceptance request. Furthermore, the information processing unit 87 may accept the numbered ticket reissue request or the numbered ticket acceptance request only when the wireless terminal 2 transmits a wireless device ID that matches with the wireless device ID contained in the numbered ticket information. Consequently, it becomes possible to reduce situations where acceptance is completed by erroneous operations.

Moreover, when receiving a member registration request from the wireless device 3, the information processing unit 87 stores information contained in the member registration request into the member information table, and, when receiving a shop registration request from the wireless device 3, the information processing unit 87 stores information contained in the shop registration request into the shop information table. Furthermore, when receiving a numbered ticket list information request from the wireless device 3, the information processing unit 87 extracts, from the numbered ticket information table, numbered ticket information on the shop ID corresponding to a member ID contained in the numbered ticket list information request, and transmits numbered ticket list information containing the extracted numbered ticket information to the wireless terminal 2 being a request source.

1.5.3. Flow of Processes

Figure 15:
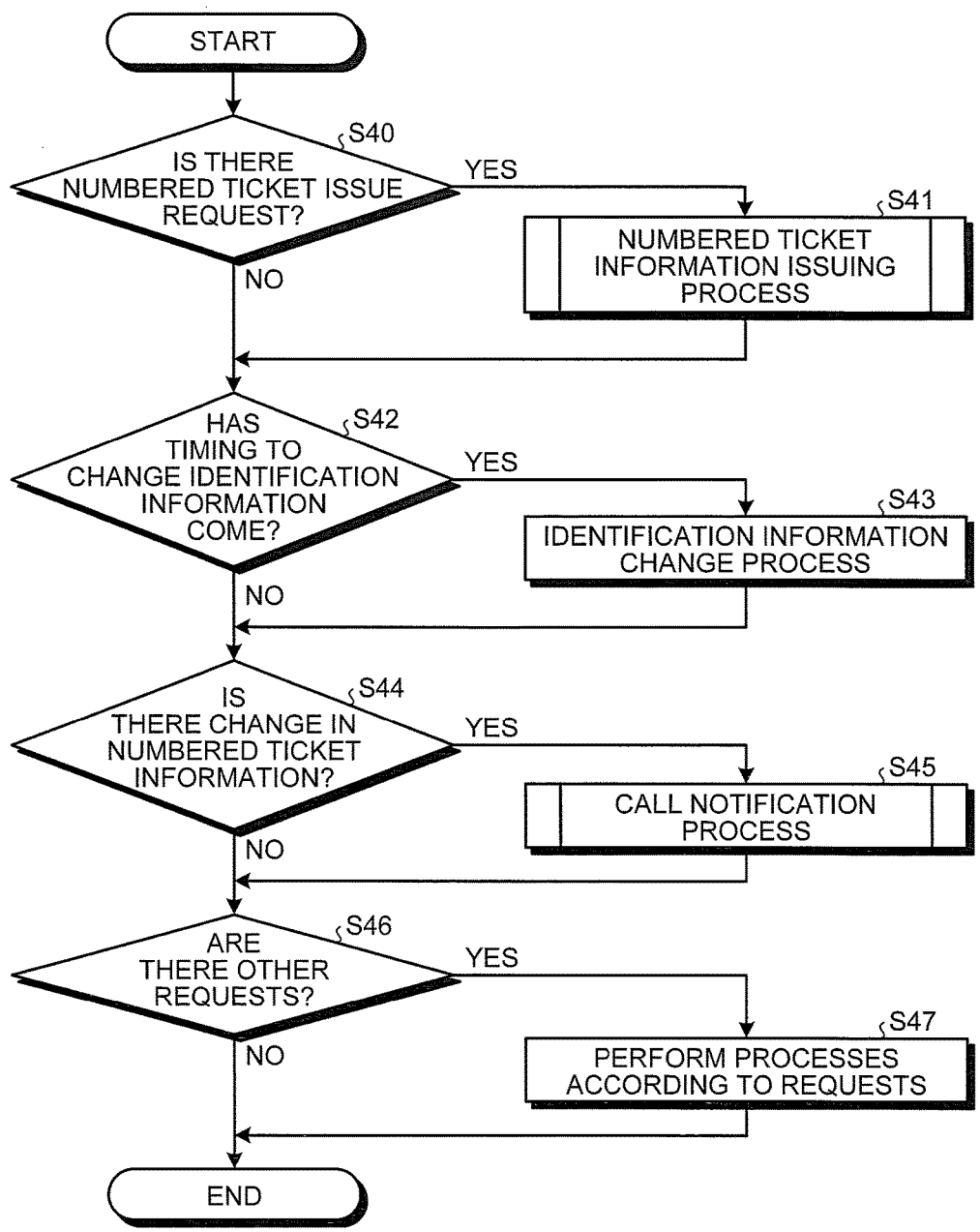
FIG. 15 is a flowchart illustrating an example of information processing performed by the numbered ticket information issuing server.

Information processing performed by the numbered ticket information issuing server 4 according to the first embodiment will be described below. FIG. 15 is a flowchart illustrating an example of the information processing performed by the numbered ticket information issuing server 4. These operations are processes repeatedly performed by the control unit 62 of the numbered ticket information issuing server 4.

As illustrated in FIG. 15, the control unit 62 determines whether there is a numbered ticket issue request from the wireless terminal 2 or the wireless device 3 (Step S40). When determining that there is the numbered ticket issue request (Step S40; Yes), the control unit 62 performs a numbered ticket information issuing process (Step S41). The numbered ticket information issuing process is a process illustrated at Steps S51 to S54 in FIG. 16, and will be described in detail later.

At Step S40, when determining that there is no numbered ticket issue request (Step S40; No) or when completing the process at Step S41, the control unit 62 determines whether a timing to change identification information has come (Step S42). When determining that the timing to change the identification information has come (Step S42: Yes), the control unit 62 performs an identification information change process (Step S43). Specifically, the control unit 62 generates new identification information for each shop, and transmits the generated new identification information to the wireless device 3 of each shop. Incidentally, if a secret key is used, the process at Steps S42 and S43 is not performed.

At Step S42, when determining that the timing to change the identification information has not come (Step S42; No) or when completing the process at Step S43, the control unit 62 determines whether there is a change in the numbered ticket information (Step S44). The control unit 62 determines that there is a change in the numbered ticket information for example when numbered ticket information is added, when a call notification corresponding to the numbered ticket information is performed, or when the numbered ticket information is cancelled.

When determining that there is a change in the numbered ticket information (Step S44; Yes), the control unit 62 performs a call notification process (Step S45). The call notification process is a process illustrated at Steps S61 to S63 in FIG. 17, and will be described in detail later.

At Step S44, when determining that there is no change in the numbered ticket information (Step S44; No) or when completing the process at Step S45, the control unit 62 determines whether there are other requests or the like from the wireless terminal 2 or the wireless device 3 (Step S46). When determining that there are other requests or the like (Step S46; Yes), the control unit 62 performs processes according to the requests (Step S47).

At Step S46, when determining that there is no other request or the like (Step S46; No) or when completing the process at Step S47, the control unit 62 ends the process.

Figure 16:
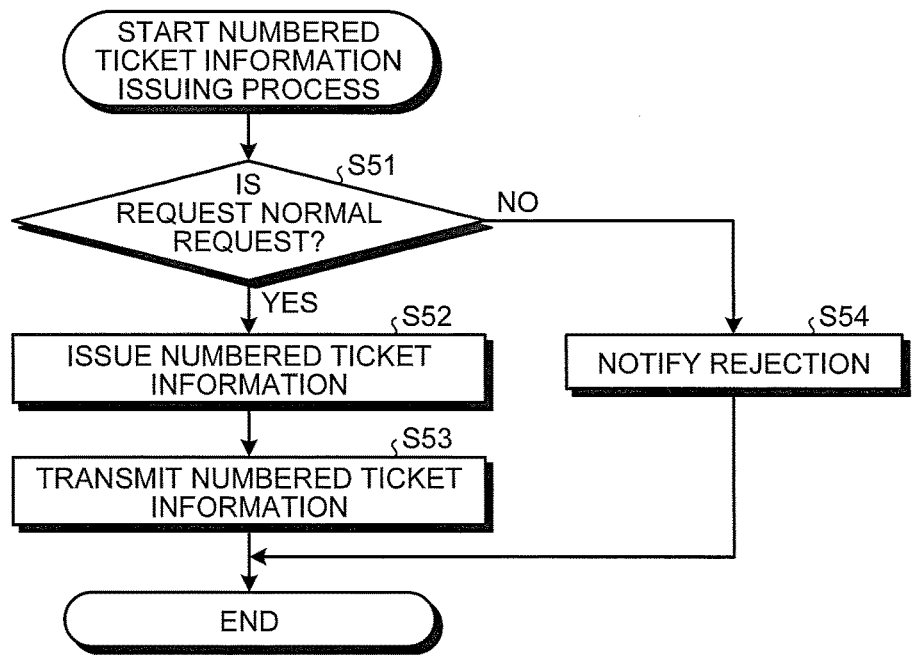
FIG. 16 is a flowchart illustrating an example of a numbered ticket information issuing process.

FIG. 16 is a flowchart illustrating an example of the numbered ticket information issuing process. As illustrated in FIG. 16, when starting the numbered ticket information issuing process, the control unit 62 determines whether the numbered ticket issue request is a normal request (Step S51). The control unit 62 determines that the numbered ticket issue request is a normal request when a combination of a wireless device ID and a shop ID contained in the numbered ticket issue request is contained in the shop information table.

When determining that the numbered ticket issue request is a normal request (Step S51; Yes), the control unit 62 issues numbered ticket information (Step S52), sets the issued numbered ticket information in the numbered ticket information table, and transmits the issued numbered ticket information to the wireless terminal 2 or the wireless device 3 being a request source (Step S53). In contrast, when determining that the numbered ticket issue request is not a normal request (Step S51; No), the control unit 62 transmits a rejection notice, which indicates that issuance of the numbered ticket information is rejected, to the wireless terminal 2 or the wireless device 3 being the request source (Step S54). When the process at Steps S53 and S54 ends, the control unit 62 ends the process.

Figure 17:
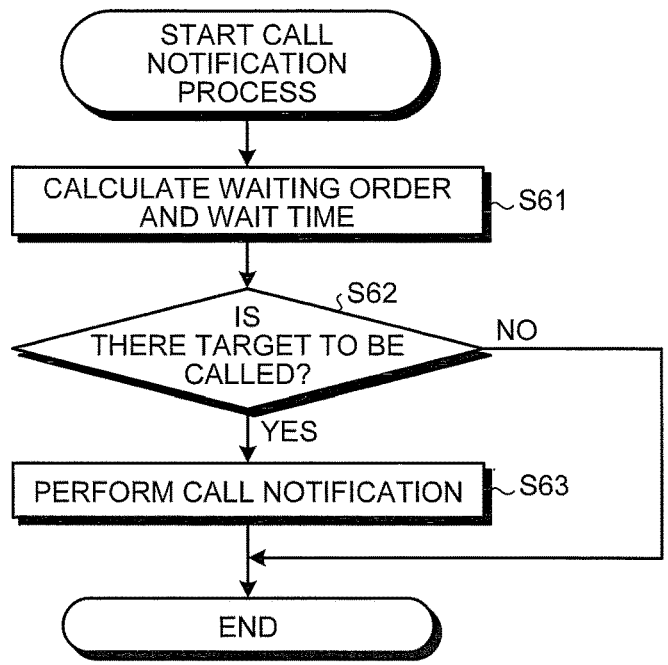
FIG. 17 is a flowchart illustrating an example of a call notification process.

FIG. 17 is a flowchart illustrating an example of the call notification process. As illustrated in FIG. 17, when starting the call notification process, the control unit 62 calculates a waiting order and a wait time for each user U of the wireless terminal 2 corresponding to the shop ID for which there is a change in the numbered ticket information in the numbered ticket information table (Step S61).

Subsequently, the control unit 62 determines whether there is the wireless terminal 2 to be called (Step S62). The control unit 62 determines that there is the wireless terminal 2 to be called when there is a user U whose waiting order is within a predetermined range. When determining that there is the wireless terminal 2 to be called (Step S62; Yes), the control unit 62 performs a call notification on the wireless terminal 2 to be called (Step S63).

When determining that there is no wireless terminal 2 to be called (Step S62: No) or when completing the process at Step S63, the control unit 62 ends the process.

2. Second Embodiment

A numbered ticket information issuing system according to a second embodiment will be described below. In the numbered ticket information issuing system 1 according to the first embodiment, the numbered ticket information issuing server 4 determines whether a numbered ticket issue request is normal. In contrast, in the numbered ticket information issuing system according to the second embodiment, a wireless terminal is allowed to perform a normal numbered ticket issue request.

In the numbered ticket information issuing system according to the second embodiment, configurations of the wireless terminal and the numbered ticket information issuing server are partly different, but other configurations are the same as those of the numbered ticket information issuing system 1 according to the first embodiment. Hereinafter, the same elements as those of the wireless terminal 2 and the numbered ticket information issuing server 4 according to the first embodiment are denoted by the same symbols, and explanation thereof will be omitted appropriately.

Figure 18:
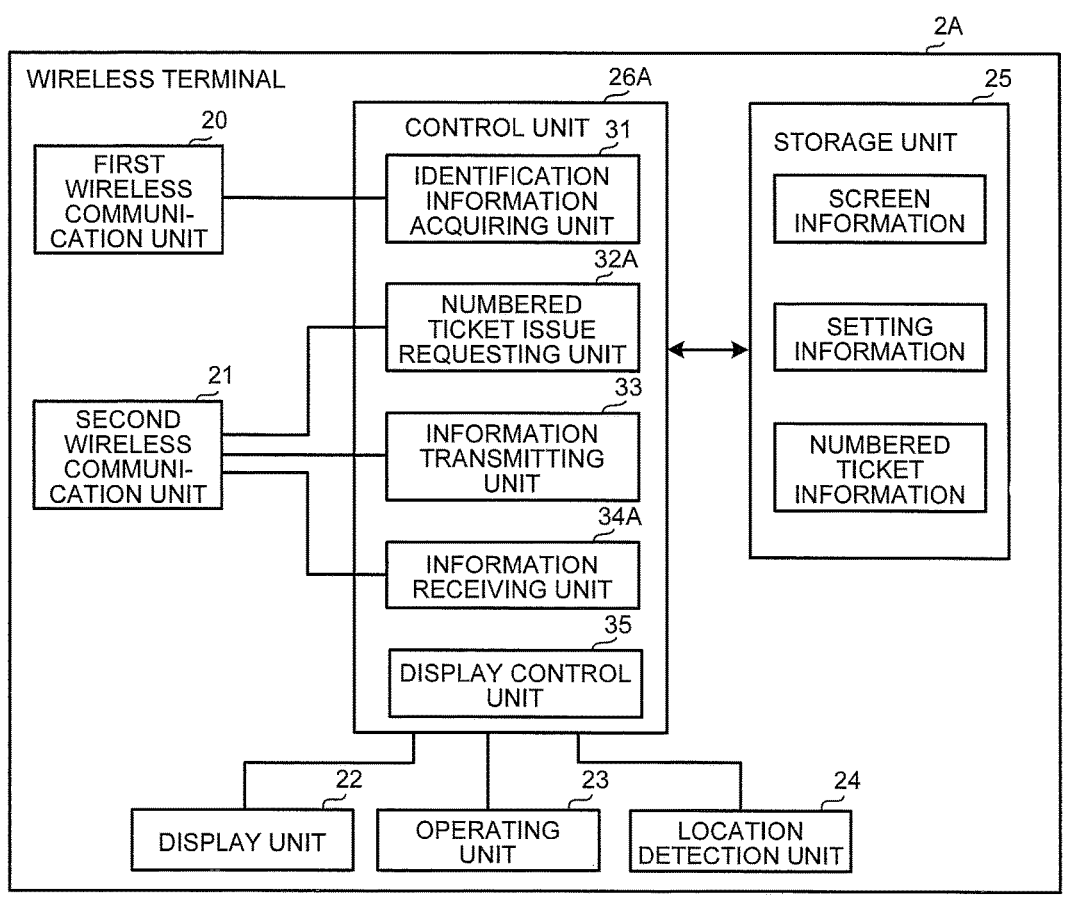
FIG. 18 is a diagram illustrating a configuration example of a wireless terminal according to a second embodiment.

FIG. 18 is a diagram illustrating a configuration example of a wireless terminal according to the second embodiment. A wireless terminal 2A according to the second embodiment includes a control unit 26A, and other configurations are the same as those of the wireless terminal 2. The control unit 26A includes an identification information acquiring unit 31, a numbered ticket issue requesting unit 32A, the information transmitting unit 33, an information receiving unit 34A, and the display control unit 35.

Shop information acquired by the information receiving unit 34A contains a wireless device ID in addition to a shop ID. When a numbered ticket issue request operation is performed through a user operation, the numbered ticket issue requesting unit 32A determines whether a wireless device ID acquired by the identification information acquiring unit 31 and a wireless device ID contained in the shop information match with each other. When the wireless device ID acquired by the identification information acquiring unit 31 and the wireless device ID contained in the shop information match with each other, the numbered ticket issue requesting unit 32A transmits a numbered ticket issue request containing the shop ID. Consequently, a normal numbered ticket issue request is transmitted from the wireless terminal 2A.

Figure 19:
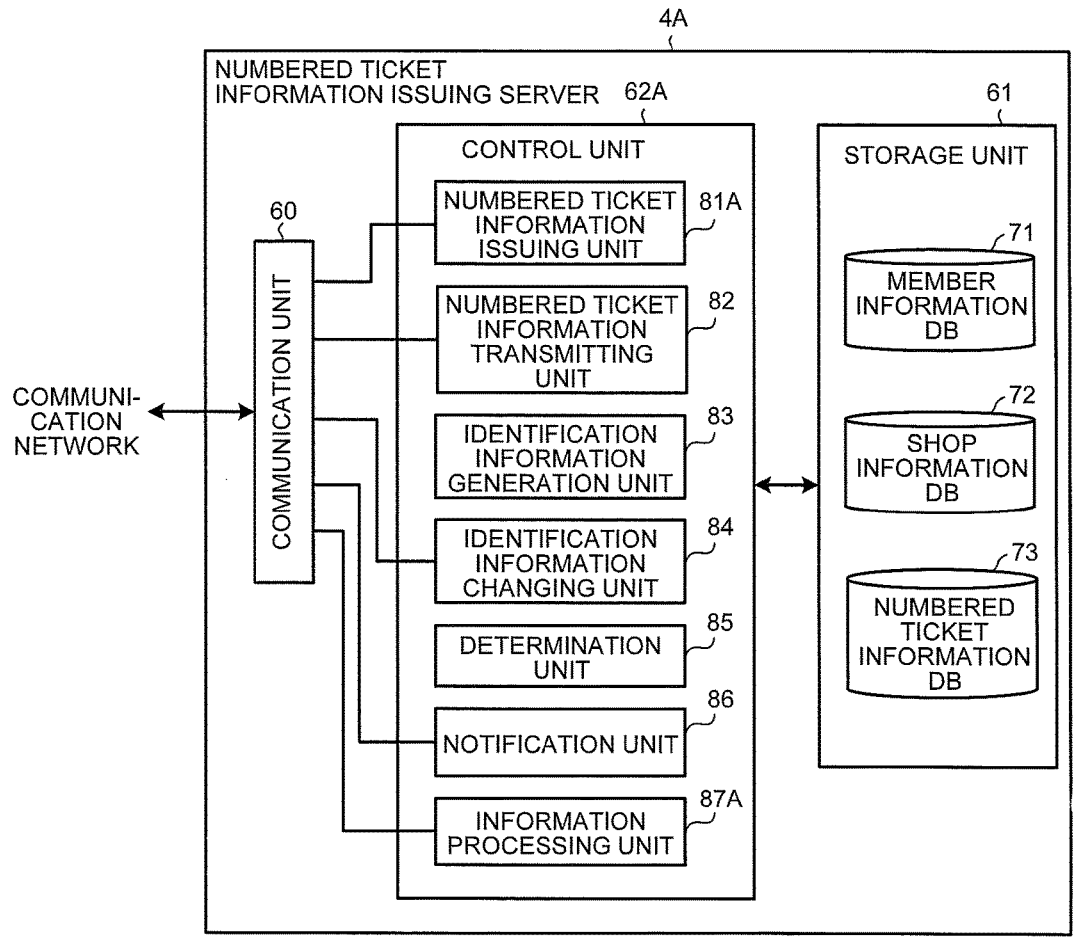
FIG. 19 is a diagram illustrating a configuration example of a numbered ticket information issuing server according to the second embodiment.

FIG. 19 is a diagram illustrating a configuration example of a numbered ticket information issuing server according to the second embodiment. A numbered ticket information issuing server 4A according to the second embodiment includes a control unit 62A, and other configurations are the same as those of the numbered ticket information issuing server 4. The control unit 62A includes a numbered ticket information issuing unit 81A, the numbered ticket information transmitting unit 82, the identification information generation unit 83, the identification information changing unit 84, the determination unit 85, the notification unit 86, and an information processing unit 87A.

The information processing unit 87A, when receiving a shop information request from the wireless terminal 2A, extracts shop information corresponding to a shop ID contained in the shop information request from the shop information table, and transmits it to the wireless terminal 2A being a request source. The shop information transmitted by the information processing unit 87A contains a wireless device ID corresponding to the shop ID, in addition to the shop information transmitted by the information processing unit 87.

The numbered ticket information issuing unit 81A, when receiving a numbered ticket issue request from the wireless terminal 2A, issues numbered ticket information. The numbered ticket issue request transmitted from the wireless terminal 2A is a normal request, and therefore, the numbered ticket information issuing unit 81A need not determine whether the numbered ticket issue request is normal. Therefore, it becomes possible to reduce processing loads on the numbered ticket information issuing server 4A.

In this manner, the numbered ticket information issuing system according to the second embodiment can cause the wireless terminal 2A to transmit a normal numbered ticket issue request by including a wireless device ID in shop information transmitted from the numbered ticket information issuing server 4A to the wireless terminal 2A.

3. Modifications

In the above described embodiments, examples have been explained that the optional information includes the "number of persons", "smoking" and "seat"; however, other information may be included. For example, it is possible to include a "desired visit time", a "desired visit date and time", or the like as the optional information. In this case, the control unit 62 can issue numbered ticket information corresponding to the "desired visit time" or the "desired visit date and time". For example, the control unit 62 can accept numbered ticket information according to the numbered ticket number or the waiting order on a time scale of a predetermined time period, and therefor can improve the convenience of the user U.

In the above described embodiments, the numbered ticket issue request screen is displayed on the display unit 42 by a user operation; however, it may be possible to automatically display a numbered ticket issue request screen corresponding to a shop close to the current location of the wireless terminal 2 or 2A on the display unit 22. For example, the control unit 62 or 62A of the numbered ticket information issuing server 4 or 4A transmits, to the wireless terminal 2 or 2A, shop information on a shop close to location information transmitted from the wireless terminal 2 or 2A. Upon acquiring the shop information from the numbered ticket information issuing server 4 or 4A, the wireless terminal 2 or 2A displays a numbered ticket issue request screen based on the shop information on the display unit 22. Incidentally, the numbered ticket information issuing server 4 or 4A may refer to an issuance history of past numbered ticket information, and may transmit shop information to the wireless terminal 2 or 2A of the user U to which the past numbered ticket information has been issued.

In the congestion setting mode and the congestion avoidance mode as described above, the determination unit 85 may change a range of the wireless communication area 5. For example, the determination unit 85 may narrows the wireless communication area 5 down in the congestion setting mode, and expands the wireless communication area 5 in the congestion avoidance mode. Consequently, it becomes possible to improve the effect of each mode.

4. Hardware Configuration

Figure 20:
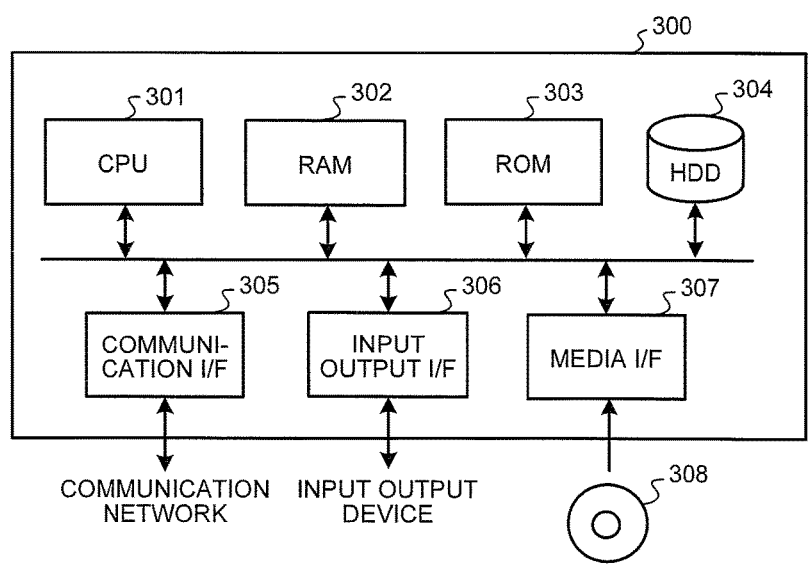
FIG. 20 is a hardware configuration diagram illustrating an example of a computer that realizes functions of the numbered ticket information issuing server.

The numbered ticket information issuing servers 4 and 4A according to the embodiments are realized by, for example, a computer 300 configured as illustrated in FIG. 20. FIG. 20 is a hardware configuration diagram illustrating an example of a computer that realizes the functions of the numbered ticket information issuing servers 4 and 4A.

The computer 300 includes a central processing unit (CPU) 301, a random access memory (RAM) 302, a read only memory (ROM) 303, a hard disk drive (HDD) 304, a communication interface (I/F) 305, an input output interface (I/F) 306, and a media interface (I/F) 307.

The CPU 301 operates based on programs stored in the ROM 303 or the HDD 304 and controls each unit. The ROM 303 stores therein a boot program executed by the CPU 301 when the computer 300 is activated, programs dependent on hardware of the computer 300, or the like.

The HDD 304 stores therein programs executed by the CPU 301, data used by the programs, or the like. The communication interface 305 corresponds to the communication unit 60, receives data from other devices via the communication network 6, sends the data to the CPU 301, and transmits data generated by the CPU 301 to other devices via the communication network 6.

The CPU 301 controls an output device, such as a display or a printer, and an input device, such as a keyboard or a mouse, via the input output interface 306. The CPU 301 acquires data from the input device via the input output interface 306. Furthermore, the CPU 301 outputs generated data to the output device via the input output interface 306.

The media interface 307 reads programs or data stored in a recording medium 308, and provides them to the CPU 301 via the RAM 302. The CPU 301 loads the programs from the recording medium 308 onto the RAM 302 via the media interface 307, and executes the loaded programs. The recording medium 308 is, for example, an optical recording medium such as a digital versatile disk (DVD) or a phase change rewritable disk (PD), a magneto optical recording medium such as a magneto-optical (MO) disk, a tape medium, a magnetic recording medium, a semiconductor memory, or the like.

When the computer 300 functions as the numbered ticket information issuing server 4 or 4A, the CPU 301 of the computer 300 executes the programs loaded on the RAM 302 and realizes the functions of the numbered ticket information issuing unit 81 or 81A, the numbered ticket information transmitting unit 82, the identification information generation unit 83, the identification information changing unit 84, the determination unit 85, the notification unit 86, and the information processing unit 87 or 87 of the control unit 62 or 62A. Furthermore, the HDD 304 realizes the functions of the storage unit 61.

The CPU 301 of the computer 300 reads and executes the programs from the recording medium 308. However, as another example, the programs may be acquired from other devices via the communication network 6.

5. Advantageous Effects

The numbered ticket information issuing system according to the embodiments includes the wireless terminal 2 or 2A and the numbered ticket information issuing server 4 or 4A. The wireless terminal 2 or 2A includes the identification information acquiring unit 31, the numbered ticket issue requesting unit 32 or 32A, and the information receiving unit 34 or 34A (an example of a numbered ticket information receiving unit). The numbered ticket information issuing server 4 or 4A includes the numbered ticket information issuing unit 81 or 81A and the numbered ticket information transmitting unit 82. The identification information acquiring unit 31 acquires the wireless device ID (an example of identification information) of the wireless device 3 from the wireless device 3 installed in a place corresponding to a shop or a facility that provides a product or a service. The numbered ticket issue requesting unit 32 or 32A transmits a numbered ticket issue request to the numbered ticket information issuing server 4 or 4A based on the wireless device ID of the wireless device 3 acquired by the identification information acquiring unit 31. The information receiving unit 34 or 34A receives numbered ticket information transmitted from the numbered ticket information issuing server 4 or 4A according to the numbered ticket issue request. The numbered ticket information issuing unit 81 or 81A, when receiving the numbered ticket issue request from the wireless terminal 2 or 2A, issues numbered ticket information on the shop or the facility corresponding to the numbered ticket issue request. The numbered ticket information transmitting unit 82 transmits the numbered ticket information issued by the numbered ticket information issuing unit 81 or 81A to the wireless terminal 2 or 2A.

Therefore, it becomes possible to easily issue the numbered ticket information without installing a numbered ticket issuing apparatus in the shop or the facility. Furthermore, the numbered ticket information is issued on condition that the user U of the wireless terminal 2 goes to the wireless communication area 5 of the wireless device 3 installed in the shop or the facility for which the numbered ticket information is to be acquired. Consequently, it becomes possible to prevent unfairness between the user U who acquires numbered ticket information by the wireless terminal 2 and a user who acquires numbered ticket information by the wireless device 3.

Furthermore, the numbered ticket issue requesting unit 32 of the wireless terminal 2 transmits, to the numbered ticket information issuing server 4, the numbered ticket issue request containing the wireless device ID of the wireless device 3 acquired by the identification information acquiring unit 31. The numbered ticket information issuing unit 81 of the numbered ticket information issuing server 4, when receiving the numbered ticket issue request from the wireless terminal 2, issues numbered ticket information on the shop or the facility corresponding to the wireless device ID contained in the numbered ticket issue request.

Therefore, when a fraudulent numbered ticket issue request is transmitted from the wireless terminal 2, it becomes possible to easily prevent the numbered ticket information from being issued.

Moreover, the numbered ticket information issuing server 4A includes the information processing unit 87A (an example of an identification information transmitting unit) that transmits the wireless device ID of the wireless device 3 to the wireless terminal 2A. Furthermore, the wireless terminal 2A includes the information receiving unit 34A that receives the wireless device ID of the wireless device 3 from the numbered ticket information issuing server 4A. The numbered ticket issue requesting unit 32A of the wireless terminal 2A transmits the numbered ticket issue request to the numbered ticket information issuing server 4A when the wireless device ID received by the information receiving unit 34A and the wireless device ID acquired by the identification information acquiring unit 31 match with each other.

Therefore, it becomes possible to include the wireless device ID in information transmitted from the numbered ticket information issuing server 4A to the wireless terminal 2A, and to cause the wireless terminal 2A to transmit a normal numbered ticket issue request.

Furthermore, the numbered ticket information issuing server 4 or 4A includes the identification information changing unit 84 (an example of a changing unit). The identification information changing unit 84 requests the wireless device 3 to change the wireless device ID.

Therefore, it becomes possible to prevent a fraudulent numbered ticket issue request from the wireless terminal 2 or 2A that is not in or around the location of the shop or the facility, and improve the security.

Moreover, the numbered ticket information issuing server 4 or 4A includes the identification information generation unit 83 (an example of a generation unit). The identification information generation unit 83 generates the wireless device ID at random or according to a predetermined rule. The identification information changing unit 84 requests the wireless device 3 to employ the wireless device ID generated by the identification information generation unit 83 as changed identification information.

Therefore, the numbered ticket information issuing server 4 or 4A can determine the wireless device ID output by the wireless terminal 2 or 2A, and as compared with the case of a periodical change by the wireless device 3, it is possible to reduce processing loads on the wireless device 3.

Furthermore, the wireless device ID is generated by encrypting a time by a secret key. The numbered ticket information issuing unit 81 or 81A issues numbered ticket information on the shop or the facility corresponding to the secret key for decrypting the wireless device ID.

Therefore, it becomes possible to periodically change a value of the wireless device ID without periodically transmitting the wireless device ID from the numbered ticket information issuing server 4 or 4A to the wireless terminal 2 or 2A.

Moreover, the numbered ticket information issuing server 4 or 4A includes the determination unit 85 and the notification unit 86. The determination unit 85 determines a waiting order for a product or a service corresponding to the numbered ticket information transmitted to the wireless terminal 2 or 2A. The notification unit 86 performs a call notification on the wireless terminal 2 or 2A when the waiting order determined by the determination unit 85 is in a predetermined range.

Therefore, it becomes possible to cause the user U to visit the shop at an appropriate timing.

Furthermore, the numbered ticket information issuing server 4 or 4A includes the information processing unit 87 or 87A (an example of a terminal location acquiring unit). The information processing unit 87 or 87A acquires a location of the wireless terminal 2 or 2A. The notification unit 86 changes the predetermined range according to the location of the wireless terminal 2 or 2A acquired by the information processing unit 87 or 87A.

Therefore, even when the user U is in a place distant from the shop or the facility, it becomes possible to cause the user U to visit the shop at an appropriate timing.

Moreover, the determination unit 85 changes the waiting order according to the degree of presence of the wireless terminal 2 or 2A, which has issued the numbered ticket issue request, in the communication area 5 of the wireless device 3.

Therefore, it becomes possible to adjust the degree of congestion around the shop or the facility. For example, it becomes possible to increase the degree of congestion around the shop or the facility by preferentially reducing the waiting order of the user U with higher degree of presence around a target shop or a target facility of the numbered ticket information, and it becomes possible to prevent congestion around the shop or the facility by preferentially reducing the waiting order of the user U with lower degree of presence around a target shop or a target facility of the numbered ticket information.

6. Others

Several embodiments of the invention have been described in detail above based on the drawings. The embodiments are illustrative, and the invention may be embodied in other modes with various changes or modifications including the aspects described in the Detailed Description of the Embodiments on the basis of knowledge of those skilled in the art.

The above described numbered ticket information issuing server 4 or 4A may be realized by a plurality of server computers and the structure of the system may be flexibly changed depending on the functions by, for example, calling and implementing an external platform by an application programming interface (API) or network computing.

According to an embodiment of the present invention, it is possible to provide a numbered ticket information issuing system, a numbered ticket information issuing server, and a numbered ticket information issuing method capable of easily issuing numbered ticket information without arranging a numbered ticket issuing apparatus in a shop or a facility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A numbered ticket information issuing system comprising:
a plurality of wireless terminals each including a wireless terminal processor; and
a numbered ticket information issuing server including:
(i) a memory storing a shop information database including shop identification information and wireless device identification information corresponding to a shop or a facility that provides a product or a service, and (ii) a server processor operatively coupled to the memory, wherein:
the wireless terminal processor of each of the plurality of wireless terminals is programmed to:
detect a wireless signal transmitted from a wireless device installed in the shop or the facility upon entering a communication area of the wireless device;
acquire, from the wireless device installed in the shop or the facility, wireless device identification information contained in the signal transmitted by the wireless device, the signal being acquired in response to the wireless terminal entering the communication area of the wireless device, the signal being repeatedly transmitted from the wireless device;
store the acquired wireless device identification information in a wireless terminal memory;
delete the stored wireless device identification information from the wireless terminal memory when the wireless device identification information is not acquired from the wireless device within a predetermined period;
in response to acquiring the wireless device identification information, create and transmit a numbered ticket issue request to the numbered ticket information issuing server, the numbered ticket issue request including the acquired wireless device identification information and the shop identification information, and requesting the numbered ticket information issuing server to transmit a numbered ticket to the wireless terminal corresponding to the wireless device identification information; and receive, from the numbered ticket information issuing server, numbered ticket information corresponding to the numbered ticket issue request, the numbered ticket information including the numbered ticket associated with the wireless device; and the server processor of the numbered ticket information issuing server is programmed to:

receive the numbered ticket issue request from the wireless terminal requesting the numbered ticket, the numbered ticket issue request including the wireless device identification information and the shop identification information;

determine whether the wireless device identification information included in the numbered ticket issue request is associated with the shop identification information by comparing the wireless device identification information and the shop identification information included in the numbered ticket issue request to the wireless device identification information and the shop identification information stored in the shop information database;

in response to determining that the wireless device identification information is associated with the shop identification information, generate and format the numbered ticket information into a numbered ticket that is in a format readable by the wireless terminal corresponding to the numbered ticket issue request;

transmit the generated and formatted numbered ticket to the wireless terminal, whereby the wireless terminal receives the number ticket without the wireless device being configured to issue numbered tickets;

calculate a weighting value that changes as a transmission frequency of the wireless device identification information from the plurality of wireless terminals to the numbered ticket information issuing server via the network changes;

multiply a waiting order of the product or the service corresponding to the numbered ticket information of the each wireless terminal by the calculated weighting value; and update and change the waiting order of the product or the service corresponding to the numbered ticket information of the each wireless terminal based on the multiplied result, such that the waiting order of the product or the service corresponding to the numbered ticket information of the each wireless terminal is continuously changed and updated based on the transmission frequency of the wireless device identification information from the plurality of wireless terminals within the communication area.

2. The numbered ticket information issuing system according to claim 1, wherein:

the wireless terminal processor is programmed to transmit, to the numbered ticket information issuing server, the numbered ticket issue request containing the acquired identification information on the wireless device; and the server processor of the numbered ticket information issuing server, when receiving the numbered ticket issue request from the wireless terminal, is programmed to issue the numbered ticket information on the shop or the facility corresponding to the identification information contained in the numbered ticket issue request.

3. The numbered ticket information issuing system according to claim 1, wherein:

the server processor of the numbered ticket information issuing server is programmed to transmit identification information on the wireless device to the wireless terminal; and the wireless terminal processor is programmed to:

receive the identification information on the wireless device from the numbered ticket information issuing server; and transmit the numbered ticket issue request to the numbered ticket information issuing server when the received identification information and the acquired identification information match with each other.

4. The numbered ticket information issuing system according to claim 1, wherein the server processor of the numbered ticket information issuing server is programmed to request the wireless device to change the identification information.

5. The numbered ticket information issuing system according to claim 4, wherein the server processor of the numbered ticket information issuing server is programmed to:

generate the identification information at random or according to a predetermined rule; and request the wireless device to employ the generated identification information as changed identification information.

6. The numbered ticket information issuing system according to claim 1, wherein:

the identification information is generated by encrypting a time by a secret key; and the server processor of the numbered ticket information issuing server is programmed to issue numbered ticket information on the shop or the facility corresponding to the secret key for decrypting the identification information.

7. The numbered ticket information issuing system according to claim 1, wherein the server processor of the numbered ticket information issuing server is programmed to:

determine the waiting order for the product or the service corresponding to the numbered ticket information transmitted to the wireless terminal; and perform a call notification on the wireless terminal when a determined waiting order is within a predetermined range.

8. The numbered ticket information issuing system according to claim 7, wherein the server processor of the numbered ticket information issuing server is programmed to:

acquire a location of the wireless terminal; and change the predetermined range according to the acquired location of the wireless terminal.

9. The numbered ticket information issuing system according to claim 7, wherein the server processor of the numbered ticket information issuing server is programmed to change the waiting order according to a degree of presence of the wireless terminal, which has issued the numbered ticket issue request, in a communication area of the wireless device.

10. A numbered ticket information issuing server comprising:

a processor programmed to:

receive a numbered ticket issue request from a wireless terminal requesting a numbered ticket, the numbered ticket issue request including wireless device identification information and shop identification information;

determine whether the wireless device identification information included in the numbered ticket issue request is associated with the shop identification information by comparing the wireless device identification information and the shop identification information included in the numbered ticket issue request to wireless device identification information and shop identification information stored in a shop information database;

in response to determining that the wireless device identification information is associated with the shop identification information, generate and format numbered ticket information into a numbered ticket that is in a format readable by the wireless terminal corresponding to the numbered ticket issue request;

transmit the generated and formatted numbered ticket to the wireless terminal, whereby the wireless terminal receives the number ticket without the wireless device being configured to issue numbered tickets;

calculate a weighting value that changes as a transmission frequency of the wireless device identification information from the plurality of wireless terminals to the numbered ticket information issuing server via the network changes;

multiply a waiting order of the product or the service corresponding to the numbered ticket information of the each wireless terminal by the calculated weighting value; and update and change the waiting order of the product or the service corresponding to the numbered ticket information of the each wireless terminal based on the multiplied result, such that the waiting order of the product or the service corresponding to the numbered ticket information of the each wireless terminal is continuously changed and updated based on the transmission frequency of the wireless device identification information from the plurality of wireless terminals within the communication area.

11. A numbered ticket information issuing method comprising:

detecting, by a plurality of wireless terminal each from a wireless device installed in a place corresponding to a shop or a facility that provides a product or a service, a wireless signal transmitted from a terminal device installed in the shop or the facility upon entering a communication area of the terminal device;

acquiring, by the wireless terminal from the wireless device, wireless device identification information contained in the signal transmitted by the wireless device, the signal being acquired in response to the wireless terminal entering the communication area of the wireless device, the signal being repeatedly transmitted from the wireless device;

storing, by the wireless terminal, the acquired wireless device identification information in a wireless terminal memory;

deleting, by the wireless terminal, the stored wireless device identification information from the wireless terminal memory when the wireless device identification information is not acquired from the wireless device within a predetermined period;

in response to acquiring the wireless device identification information, creating and transmitting, by the wireless terminal, a numbered ticket issue request to a numbered ticket information issuing server, the numbered ticket issue request including the acquired wireless device identification information and the shop identification information, and requesting the numbered ticket information issuing server to transmit a numbered ticket to the wireless terminal corresponding to the wireless device identification information;

receiving, by the numbered ticket information issuing server, the numbered ticket issue request from the wireless terminal requesting the numbered ticket, the numbered ticket issue request including the wireless device identification information and the shop identification information;

determining, by the numbered ticket information issuing server, whether the wireless device identification information included in the numbered ticket issue request is associated with the shop identification information by comparing the wireless device identification information and the shop identification information included in the numbered ticket issue request to the wireless device identification information and the shop identification information stored in the shop information database;

in response to determining that the wireless device identification information is associated with the shop identification information, generating and formatting, by the numbered ticket information issuing server, the numbered ticket information into a numbered ticket that is in a format readable by the wireless terminal corresponding to the numbered ticket issue request;

transmitting, by the numbered ticket information issuing server, the generated and formatted numbered ticket to the wireless terminal, whereby the wireless terminal receives the number ticket without the wireless device being configured to issue numbered tickets;

acquiring, by the wireless terminal, the numbered ticket transmitted from the numbered ticket information issuing server according to the numbered ticket issue request, the numbered ticket information including the numbered ticket associated with the wireless device:

calculating, by the numbered ticket information issuing server, a weighting value that changes as a transmission frequency of the wireless device identification information from the plurality of wireless terminals to the numbered ticket information issuing server via the network changes;

multiplying, by the numbered ticket information issuing server, a waiting order of the product or the service corresponding to the numbered ticket information of the each wireless terminal by the calculated weighting value; and updating and changing, by the numbered ticket information issuing server, the waiting order of the product or the service corresponding to the numbered ticket information of the each wireless terminal based on the multiplied result, such that the waiting order of the product or the service corresponding to the numbered ticket information of the each wireless terminal is continuously changed and updated based on the transmission frequency of the wireless device identification information from the plurality of wireless terminals within the communication area.

* * * * *